US 7,834,112 B2

(12) United States Patent
Mihan et al.

(10) Patent No.: US 7,834,112 B2
(45) Date of Patent: *Nov. 16, 2010

(54) METHOD OF POLYMERIZATION OF OLEFINS

(75) Inventors: Shahram Mihan, Ludwigshafen (DE); Birgit Dorer, Rhode St. Genese (BE); Markus Enders, Heidelberg (DE); Pablo Fernandez, Heidelberg (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/489,387

(22) PCT Filed: Sep. 10, 2002

(86) PCT No.: PCT/EP02/10130

§ 371 (c)(1),
(2), (4) Date: Mar. 11, 2004

(87) PCT Pub. No.: WO03/025028

PCT Pub. Date: Mar. 27, 2003

(65) Prior Publication Data

US 2004/0249095 A1   Dec. 9, 2004

(30) Foreign Application Priority Data

Sep. 14, 2001  (DE) ................................ 101 45 454

(51) Int. Cl.
*C08F 4/54* (2006.01)
*C08F 4/52* (2006.01)
*C08F 4/64* (2006.01)
*C08F 4/69* (2006.01)

(52) U.S. Cl. ...................... 526/161; 526/171; 526/160; 526/170; 526/176; 526/177; 526/178; 526/169; 526/941; 502/114; 502/103; 502/104; 502/152

(58) Field of Classification Search ................. 526/172, 526/182, 114, 115, 117, 152, 187, 173, 161, 526/123, 176; 502/129, 217, 152, 103, 117, 502/133
See application file for complete search history.

(56) References Cited

U.S. PATENT DOCUMENTS

| | | | |
|---|---|---|---|
| 3,242,150 A | 3/1966 | Scoggin | |
| 3,248,179 A | 4/1966 | Norwood | |
| 5,068,489 A * | 11/1991 | Edwards et al. | 585/524 |
| 5,506,184 A * | 4/1996 | Kissin et al. | 502/115 |
| 5,637,660 A * | 6/1997 | Nagy et al. | 526/160 |
| 6,177,376 B1 | 1/2001 | Fritze et al. | |
| 6,211,311 B1 * | 4/2001 | Wang et al. | 526/131 |
| 6,255,418 B1 | 7/2001 | Jolly et al. | |
| 6,291,386 B1 * | 9/2001 | Wang | 502/124 |
| 6,353,064 B1 * | 3/2002 | Ostoja-Starzewski | 526/160 |
| 6,399,535 B1 * | 6/2002 | Shih et al. | 502/167 |
| 6,417,302 B1 | 7/2002 | Bohnen | |
| 6,437,161 B1 | 8/2002 | Mihan et al. | |
| 6,444,833 B1 | 9/2002 | Ewen et al. | |
| 6,451,724 B1 | 9/2002 | Nifant'ev et al. | |
| 6,451,728 B1 * | 9/2002 | Matsui et al. | 502/167 |
| 6,518,379 B1 * | 2/2003 | Jungling et al. | 526/172 |
| 6,583,237 B1 * | 6/2003 | Imuta et al. | 526/89 |
| 6,589,739 B2 | 7/2003 | Fisher et al. | |
| 6,635,779 B1 | 10/2003 | Ewen et al. | |
| 6,730,754 B2 | 5/2004 | Resconi et al. | |
| 6,784,261 B1 | 8/2004 | Schopf et al. | |
| 6,812,305 B2 * | 11/2004 | Kristen et al. | 526/161 |
| 6,924,248 B2 * | 8/2005 | Mihan et al. | 502/132 |
| 6,930,190 B2 | 8/2005 | Nifant'ev et al. | |
| 6,936,666 B2 | 8/2005 | Mihan et al. | |
| 7,009,014 B2 * | 3/2006 | Suzuki et al. | 526/161 |
| 7,045,644 B2 | 5/2006 | Schopf et al. | |
| 7,087,686 B2 * | 8/2006 | Britovsek et al. | 526/113 |
| 7,238,818 B2 | 7/2007 | Ewen et al. | |
| 7,259,216 B2 | 8/2007 | Mihan et al. | |

(Continued)

FOREIGN PATENT DOCUMENTS

| | | |
|---|---|---|
| DE | 197 10615 | 9/1998 |
| DE | 100 17 660 A1 * | 10/2001 |
| DE | 100 28 432 A1 * | 12/2001 |
| DE | 100 28432 | 12/2001 |
| WO | 91/09882 | 7/1991 |
| WO | 96/00243 | 1/1996 |
| WO | 97/26937 | 10/1997 |
| WO | 97/36937 | 10/1997 |
| WO | 98/22468 | 5/1998 |
| WO | 98/22486 | 5/1998 |

(Continued)

OTHER PUBLICATIONS

H. Wiesenfeldt et al., "XVII. Racemic and *meso* diastereomers of group IV metallocene derivatives with symmetrically substituted, dimethylsilanediyl-bridged ligand frameworks. Crystal structure of $R,S\text{-},Mi_2Si(3\text{-}t\text{-}Bu\text{-}5\text{-}MeC_5H_2)_2ZrCl_2$," *Journal of Organometallic Chemistry*, vol. 369, p. 359-370 (1989).

(Continued)

*Primary Examiner*—David Wu
*Assistant Examiner*—Rip A. Lee
(74) *Attorney, Agent, or Firm*—William R. Reid

(57) ABSTRACT

A process for the polymerization of olefins using a metal complex of group 3, 4, 5, 6, 7, 8, 9 or 10 of the Periodic Table comprising at least one group $C=NR^1$, $C=PR^1$, $C=O$, $C=S$ or a heteroaromatic ring system containing at least one atom from the group consisting of N, P, O and S, can be used for controlling the width of the molar mass distribution of the resulting polymers.

7 Claims, No Drawings

U.S. PATENT DOCUMENTS

| | | | |
|---|---|---|---|
| 2003/0176275 A1 | 9/2003 | Fraaije et al. | |
| 2004/0242880 A1 | 12/2004 | Mihan et al. | |

FOREIGN PATENT DOCUMENTS

| | | |
|---|---|---|
| WO | 98/27124 | 6/1998 |
| WO | 98/37106 | 8/1998 |
| WO | 98/40419 | 9/1998 |
| WO | 99/06414 | 2/1999 |
| WO | 99/24446 | 5/1999 |
| WO | 00/05277 | 2/2000 |
| WO | 00/31090 | 6/2000 |
| WO | WO 00/43426 A1 * | 7/2000 |
| WO | WO 00/71593 A1 * | 11/2000 |
| WO | 01/09148 | 2/2001 |
| WO | 01/12641 | 2/2001 |
| WO | WO 01/12641 A1 * | 2/2001 |
| WO | 01/40330 | 6/2001 |
| WO | 01/44318 | 6/2001 |
| WO | 01/53360 | 7/2001 |
| WO | WO 01/77187 A2 * | 10/2001 |
| WO | WO 01/96417 A2 * | 12/2001 |
| WO | WO 02/02649 A1 * | 1/2002 |
| WO | 02/31001 | 4/2002 |
| WO | 03/014107 | 2/2003 |
| WO | 03/024982 | 3/2003 |
| WO | 03/042253 | 5/2003 |

OTHER PUBLICATIONS

A. Döhring et al., "Donor-Ligand-Substituted Cyclopentadienylchromium(III) Complexes: A New Class of Alkene Polymerization Catalyst. 1. Amino-Substituted Systems," *Organometallics*, vol. 19(4), pp. 388-402 (2000).

J. Michl, Editor, *Chemical Reviews*, vol. 100(4-6), pp. 1169-1681 (2000).

Office Action from currently pending U.S. Appl. No. 10/489,023 with mail date Aug. 8, 2006.

Response to Restriction Requirement from currently pending U.S. Appl. No. 10/489,023 with mail date Sep. 8, 2006.

Office Action from currently pending U.S. Appl. No. 10/489,023 with mail date Oct. 25, 2006.

Amendment from currently pending U.S. Appl. No. 10/489,023 with mail date Mar. 27, 2007.

Office Action from currently pending U.S. Appl. No. 10/489,023 with mail date Jun. 21, 2007.

Lettau, Chemie der Heterocyclen, $1^{st}$ Ed., VEB, Weinheim, 1979, pp. 17-27.

Metalorganic catalysts for synthesis and polymerisation, Springer Verlag 1999, Ewen et al.

Halteman, Chem Rev. 92, 1992, 965-994.

Strass, Chem. Rev., 1993, 93, 927-942.

P. Jutzi, U. Siemeling, J. Orgmet. Chem., 1995, 500, 175-185.

Enders et al., Chem. Ber., 1996, 129, 459-463.

J. Am. Chem. Soc. 120, pp. 4049 ff, 1998, Small et al.

J. Chem. Soc., Chem. Commun., 1998, 849, Britovsek et al.

Wakefield, Organomagnesium methods in organic synthesis, pp. 96 ff, 1995.

* cited by examiner

METHOD OF POLYMERIZATION OF OLEFINS

The present invention relates to a process for the polymerization of olefins using a metal complex of group 3, 4, 5, 6, 7, 8, 9 or 10 of the Periodic Table comprising at least one group C=NR$^1$, C=PR$^1$, C=O, C=S or a heteroaromatic ring system containing at least one atom from the group consisting of N, P, O and S, and polymers which are obtainable in this way.

The invention further relates to the use of the process for controlling the width of the molar mass distribution.

Organotransition metal compounds such as metallocene complexes are of great interest as catalysts for olefin polymerization because they make it possible to synthesize polyolefins which are not obtainable using conventional Ziegler-Natta catalysts. For example, such single-site catalysts lead to polymers having a narrow molar mass distribution and a uniform incorporation of comonomer(s). Apart from bis(cyclopentadienyl) compounds, use is also made of "constrained geometry" catalysts. These are mostly titanium complexes in the oxidation state 4 having only one cyclopentadienyl system which is bound via a bridge to an anionic amide which is likewise bound to the titanium center.

However, the narrow molar mass distribution can also result in problems during processing. To avoid this, catalyst systems having two active catalyst components have been developed. This makes it possible to achieve a broadening of the molecular weight distribution through to bimodal products. Known catalyst systems of this type are, for example, combinations of two metallocenes, a metallocene and a Ziegler catalyst or a metallocene and a chromium catalyst. These two catalyst components are usually applied together to a support material. The ratio of the two catalysts to one another is therefore fixed. This means that different catalyst systems having different catalyst ratios have to be prepared in each case for different products. A further disadvantage of these systems is that one of the two catalysts is often more sensitive to small amounts of catalyst poisons and only one of the catalysts is therefore poisoned in the presence of impurities. This leads to a change in the relative proportions of polymer formed by the respective catalysts and cannot be corrected.

We have now found a process which employs only one catalyst system which can be transformed into a second catalyst system by addition of a further reagent.

The present invention accordingly provides a process for the polymerization of olefins in the presence of a catalyst system comprising A) a metal complex of group 3, 4, 5, 6, 7, 8, 9 or 10 of the Periodic Table comprising at least one group C=E or a heteroaromatic ring system containing at least one atom from the group consisting of N, P, O and S, where
  E is NR$^1$, PR$^1$, O or S,
  R$^1$ is C$_1$-C$_{20}$-alkyl, C$_2$-C$_{20}$-alkenyl, C$_6$-C$_{20}$-aryl, alkylaryl having from 1 to 10 carbon atoms in the alkyl part and 6-20 carbon atoms in the aryl part, SiR$^2_3$, where the organic radical R$^1$ may also be substituted by halogens, and
  R$^2$ are each, independently of one another, hydrogen, C$_1$-C$_{20}$-alkyl, C$_2$-C$_{20}$-alkenyl, C$_6$-C$_{20}$-aryl, alkylaryl having from 1 to 10 carbon atoms in the alkyl part and 6-20 carbon atoms in the aryl part and two radicals R$^2$ may also be joined to form a five- or six-membered ring,
B) optionally an organic or inorganic support,
C) optionally one or more cation-forming compounds and
D) optionally one or more metal compounds of group 13 of the Periodic Table, wherein the catalyst system, is reacted with a compound of the formula F-I

where
M$^1$ is Li, Na, K, Be, Mg, Ca, Sr, Ba or Zn,
R$^3$ is C$_1$-C$_{20}$-alkyl, C$_2$-C$_{20}$-alkenyl, C$_6$-C$_{20}$-aryl, alkylaryl having from 1 to 10 carbon atoms in the alkyl part and 6-20 carbon atoms in the aryl part,
R$^4$ is hydrogen, halogen, C$_1$-C$_{20}$-alkyl, C$_2$-C$_{20}$-alkenyl, C$_6$-C$_{20}$-aryl, alkylaryl having from 1 to 10 carbon atoms in the alkyl part and 6-20 carbon atoms in the aryl part or alkoxy having from 1 to 10 carbon atoms in the alkyl radical,
r$^A$ is 1 or 2
and
s$^A$ is 0 or 1, where the sum r$^A$+s$^A$ corresponds to the valence of M$^1$.

The invention further provides for the use of the process of the present invention for controlling the width of the molar mass distribution and/or the composition distribution of the comonomer content and provides polymers which can be obtained by the process.

The metal complex A) comprises at least one group C=E or a heteroaromatic ring system containing at least one atom from the group consisting of N, P, O and S. C=E can be, for example, an imino, keto, ester, thio or thioester group and is preferably an imino group.

Examples of possible carboorganic substituents R$^1$ are: C$_1$-C$_{20}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a C$_6$-C$_{10}$-aryl group as substituent, e.g. cyclopropyl, cyclobutyl, cyclopentyl, cyclohexyl, cycloheptyl, cyclooctyl, cyclononyl or cyclododecyl, C$_2$-C$_{20}$-alkenyl which may be linear, cyclic or branched and have an internal or terminal double bond, e.g. vinyl, 1-allyl, 2-allyl, 3-allyl, butenyl, pentenyl, hexenyl, cyclopentenyl, cyclohexenyl, cyclooctenyl or cyclooctadienyl, C$_6$-C$_{20}$-aryl which may bear further alkyl groups as substituents, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may bear further alkyl groups as substituents, e.g. benzyl, o-, m-, p-methylbenzyl, 1- or 2-ethylphenyl, where the organic radical R$^1$ may also be substituted by halogens such as fluorine, chlorine or bromine. The radicals R$^2$ in organosilicon substituents SiR$^2_3$ can be the same radicals as described in more detail above for R$^1$, where two R$^2$ may also be joined to form a 5- or 6-membered ring, e.g. trimethylsilyl, triethylsilyl, butyldimethylsilyl, tributylsilyl, triallylsilyl, triphenylsilyl or dimethylphenylsilyl. Preferred radicals R$^1$ are methyl, ethyl, n-propyl, isopropyl, n-butyl, isobutyl, tert-butyl, n-pentyl, n-hexyl, n-heptyl, n-octyl, vinyl, allyl, benzyl, phenyl, ortho-dialkyl- or ortho-dichloro-substituted phenyls, trialkyl- or trichloro-substituted phenyls, naphthyl, biphenyl and anthranyl. Possible organosilicon substituents are, in particular, trialkylsilyl groups having from 1 to 10 carbon atoms in the alkyl radical, in particular trimethylsilyl groups.

In preferred imino groups, the radical R$^1$ is a C$_1$-C$_{20}$-alkyl radical which may be linear or branched, e.g. methylimine, ethylimine, n-propylimine, isopropylimine, n-butylimine, isobutylimine, tert-butylimine, n-pentyl-imine, n-hexylimine, n-heptylimine, n-octylimine, n-nonylimine, n-decylimine or n-dodecylimine, a 5- to 7-membered cycloalkyl radical which may in turn bear a C$_6$-C$_{10}$-aryl group as substituent, e.g. cyclopropylimine, cyclobutylimine, cyclopentylimine, cyclohexylimine, cycloheptylimine, cyclooctylimine, cyclononylimine or cyclododecylimine, a $C_6$-$C_{20}$-aryl radical which may be of further alkyl groups as substituents, e.g. phenylimine, naphthylimine, biphenylimine, anthranylimine, o-, m-, p-methylphenylimine, 2,3-, 2,4-, 2,5- or 2,6-dimethyl-phenylimine, 2,3,4-, 2,3,5-, 2,3,6-, 2,4,5-, 2,4,6- or 3,4,5-trimethylphenylimine, or an arylalkyl radical which may be of further alkyl groups as substituents, e.g. benzylimine, o-, m-, p-methylbenzylimine, 1- or 2-ethylphenylimine, where the organic radical $R^1$ may also be substituted by halogens such as fluorine, chlorine or bromine. In particularly preferred imino groups, the radical $R^1$ is a $C_6$-$C_{20}$-aryl radical.

The metal complex A) can also bear a heteroaromatic ring system containing at least one atom from the group consisting of N, P, O and S. The heteroaromatic ring system can be individually bound, form a substituent or be fused onto another ligand system. As heteroaromatics which are individually bound or fused onto another ligand system, preference is given to heteroaromatics having a ring size of 5 or 6 ring atoms. Examples of 5-membered ring heterocycles which may contain from one to four nitrogen atoms and/or a sulfur or oxygen atom as ring members in addition to carbon atoms are furan, thiophene, pyrrole, isoxazole, 3-isothiazole, pyrazole, oxazole, thiazole, imidazole, 1,2,4-oxadiazole, 1,2,5-oxadiazole, 1,3,4-oxadiazole, 1,2,3-triazole and 1,2,4-triazole. Examples of 6-membered heteroaryl groups which may contain from one to four nitrogen atoms and/or a phosphorus atom are pyridine, phosphabenzene, pyridazine, pyrimidine, pyrazine, 1,3,5-triazine, 1,2,4-triazine and 1,2,3-triazine. The 5-membered ring and 6-membered ring heterocycles can also be substituted by $C_1$-$C_{10}$-alkyl, $C_6$-$C_{10}$-aryl, alkylaryl having from 1 to 10 carbon atoms in the alkyl part and 6-10 carbon atoms in the aryl part, trialkylsilyl or halogens such as fluorine, chlorine or bromine or be fused with one or more aromatics or heteroaromatics. Examples of benzo-fused 5-membered heteroaryl groups are indole, indazole, benzofuran, benzothiophene, benzothiazole, benzoxazole and benzimidazole. Examples of benzo-fused 6-membered heteroaryl groups are chromane, benzopyran, quinoline, isoquinoline, cinnoline, phthalazine, quinazoline, quinoxaline, 1,10-phenanthroline and quinolizine. Nomenclature and numbering of heterocycles has been taken from Lettau, Chemie der Heterocyclen, 1st edition, VEB, Weinheim 1979. The heterocycles are preferably fused with the basic cyclopentadienyl skeleton via a C—C double bond of the heterocycle. Heterocycles having one heteroatom are preferably 2,3- or b-fused.

Heteroaromatics which can form a substituent include, for example, 5-membered ring heteroaryl groups which may contain from one to four nitrogen atoms or from one to three nitrogen atoms and/or a sulfur or oxygen atom as ring members in addition to carbon atoms, e.g. 2-furyl, 2-thienyl, 2-pyrrolyl, 3-isoxazolyl, 5-isoxazolyl, 3-isothiazolyl, 5-isothiazolyl, 1-pyrazolyl, 3-pyrazolyl, 5-pyrazolyl, 2-oxazolyl, 4-oxazolyl, 5-oxazolyl, 2-thiazolyl, 4-thiazolyl, 5-thiazolyl, 2-imidazolyl, 4-imidazolyl, 5-imidazolyl, 1,2,4-oxadiazol-3-yl, 1,2,4-oxadiazol-5-yl, 1,3,4-oxadiazol-2-yl or 1,2,4-triazol-3-yl. Examples of 6-membered heteroaryl groups which may contain from one to four nitrogen atoms and/or a phosphorus atom are 2-pyridinyl, 2-phosphabenzolyl, 3-pyridazinyl, 2-pyrimidinyl, 4-pyrimidinyl, 2-pyrazinyl, 1,3,5-triazin-2-yl and 1,2,4-triazin-3-yl, 1,2,4-triazin-5-yl or 1,2,4-triazin-6-yl. The 5-membered ring and 6-membered ring heteroaryl groups may also be substituted by $C_1$-$C_{10}$-alkyl, $C_6$-$C_{10}$-aryl, alkylaryl having from 1 to 10 carbon atoms in the alkyl part and 6-10 carbon atoms in the aryl part, trialkylsilyl or halogens such as fluorine, chlorine or bromine or be fused with one or more aromatics or heteroaromatics. Examples of benzo-fused 5-membered heteroaryl groups are 2-indolyl, 7-indolyl, 2-coumaronyl, 7-coumaronyl, 2-thianaphthenyl, 7-thianaphthenyl, 3-indazolyl, 7-indazolyl, 2-benzimidazolyl and 7-benzimidazolyl. Examples of benzo-fused 6-membered heteroaryl groups are 2-quinolyl, 8-quinolyl, 3-cinnolyl, 8-cinnolyl, 1-phthalazyl, 2-quinazolyl, 4-quinazolyl, 8-quinazolyl, 5-quinoxalyl, 4-acridyl, 1-phenanthridyl and 1-phenazyl. Among these heteroaromatic systems, particular preference is given to substituted and unsubstituted 2-pyridyl and 8-quinolyl.

Preference is given to metal complexes A) in which E or at least one atom from the group consisting of N, P, O and S in the heteroaromatic ring system is bound directly to the metal in the metal complex.

In addition, further ligands may be bound to the metal atom in the metal complex. The number of further ligands depends, for example, on the oxidation state of the metal atom. Suitable further ligands are monoanionic and dianionic ligands such as those described for X. It is also possible for Lewis bases such as amines, ethers, ketones, aldehydes, esters, sulfides or phosphines to be bound to the metal center.

The group C=E or the heteroaromatic ring system containing at least one atom from the group consisting of N, P, O and S is preferably bound to a cyclopentadienyl system.

Suitable metal complexes are, for example, metallocenes having at least one ligand which is formed by a cyclo-pentadienyl or heterocyclopentadienyl together with a fused-on heteroaromatic, with the heteroaromatics preferably containing nitrogen and/or sulfur. Such compounds are described, for example, in WO 98/22486.

These are, in particular, dimethylsilanediyl(2-methyl-4-phenylindenyl)(2,5-dimethyl-N-phenyl-4-azapentalene)-zirconium dichloride, dimethylsilanediylbis(2-methyl-4-phenyl-4-hydroazulenyl)zirconium dichloride or dimethylsilanediylbis(2-ethyl-4-phenyl-4-hydroazulenyl)-zirconium dichloride.

Preference is given to using metal complexes A) of the formula $(Cp)(—Z_m\text{-}A)MX_k$, where the variables have the following meanings:

Cp is a cyclopentadienyl system,

Z is a divalent bridge between A and Cp,

A is C=$NR^5$ or an unsubstituted, substituted or fused, heteroaromatic ring system, M is a metal of group 3, 4, 5 or 6 of the Periodic Table, X are each, independently of one another, fluorine, chlorine, bromine, iodine, hydrogen, $C_1$-$C_{10}$-alkyl, $C_2$-$C_{10}$-alkenyl, $C_6$-$C_{20}$-aryl, alkylaryl having 1-10 carbon atoms in the alkyl part and 6-20 carbon atoms in the aryl part, $NR^6R^7$, $OR^6$, $SR^6$, $SO_3R^6$, $OC(O)R^6$, $BF_4^-$, $PF_6^-$ or a bulky non-coordinating anion, $R^5$-$R^7$ are each, independently of one another, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part, $SiR^8{}_3$, where the organic radicals $R^5$-$R^7$ may also be substituted by halogens and two radicals $R^5$-$R^7$ may also be joined to form a five- or six-membered ring, $R^8$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part and two radicals $R^8$ may also be joined to form a five- or six-membered ring, k is 1, 2 or 3 and m is 1, or may also be 0 when A is a hetero-aromatic ring system.

Cp is a cyclopentadienyl system or a cyclopentadienyl system having at least one fused-on heterocycle. In the following, cyclopentadienyl refers to a $C_5$ ring system having 6 π electrons, where one of the carbon atoms may also be replaced by nitrogen or phosphorus, preferably phosphorus. Preference is given to using $C_5$ ring systems without replacement by a heteroatom. A heteroaromatic containing at least one atom from the group consisting of N, P, O and S may be fused onto this basic cyclopentadienyl skeleton.

For the present purposes, fused-on means that the heteroaromatic- and the cyclopentadienyl skeleton share two atoms, preferably carbon atoms. Preference is given to cyclopentadienyl systems Cp of the formula (F-II)

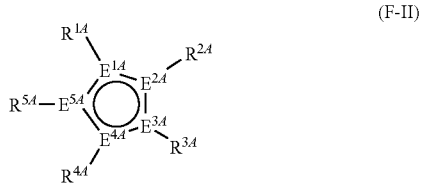

(F-II)

where the variables have the following meanings:

$E^{1A}$-$E^{5A}$ are each carbon or at most one $E^{1A}$ to $E^{5A}$ phosphorus or nitrogen, $R^{1A}$-$R^{5A}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part, $SiR^{6A}_3$, where 1 organic radical $R^{1A}$-$R^{6A}$ is —Z-A or A and the organic radicals $R^{1A}$-$R^{6A}$ may also be substituted by halogens and two vicinal radicals $R^{1A}$-$R^{6A}$ may also be joined to form a five- or six-membered, ring, and/or two vicinal radicals $R^{1A}$-$R^{6A}$ are joined to form a heteroaromatic which contains at least one atom from the group consisting of N, P, O and S, and $R^{6A}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl radical and 6-20 carbon atoms in the aryl radical and two geminal radicals $R^{6A}$ may also be joined to form a five- or six-membered ring.

In preferred cyclopentadienyl systems Cp, all $E^{1A}$ to $E^{5A}$ are carbon.

Two vicinal radicals $R^{1A}$-$R^{5A}$ may also form a heteroaromatic which contains at least one atom from the group consisting of nitrogen, phosphorus, oxygen and sulfur, particularly preferably nitrogen and/or sulfur. Preference is given to heteroaromatics having a ring size of 5 or 6 ring atoms. Examples of 5-membered ring heteroaromatics, which may contain from one to four nitrogen atoms and/or a sulfur or oxygen atom as ring members in addition to carbon atoms, are furan, thiophene, pyrrole, isoxazole, 3-isothiazole, pyrazole, oxazole, thiazole, imidazole, 1,2,4-oxadiazole, 1,2,5-oxadiazole, 1,3,4-oxadiazole, 1,2,3-triazole and 1,2,4-triazole. Examples of 6-membered heteroaryl groups, which may contain from one to four nitrogen atoms and/or a phosphorus atom, are pyridine, phosphabenzene, pyridazine, pyrimidine, pyrazine, 1,3,5-triazine, 1,2,4-triazine and 1,2,3-triazine. The 5-membered ring and 6-membered ring heteroaromatics may also be substituted by $C_1$-$C_{10}$-alkyl, $C_6$-$C_{10}$-aryl, alkylaryl having from 1 to 10 carbon atoms in the alkyl part and 6-10 carbon atoms in the aryl part, trialkylsilyl or halogens such as fluorine, chlorine or bromine or be fused with one or more aromatics or heteroaromatics. Examples of benzo-fused 5-membered heteroaryl groups are indole, indazole, benzofuran, benzothiophene, benzothiazole, benzoxazole and benzimidazole. Examples of benzo-fused 6-membered heteroaryl groups are chromane, benzopyran, quinoline, isoquinoline, cinnoline, phthalazine, quinazoline, quinoxaline, 1,10-phenanthroline and quinolizine. Nomenclature and numbering of the heteroaromatics has been taken from Lettau, Chemie der Heterocyclen, 1st edition, VEB, Weinheim 1979. The heteroaromatics are fused to the basic cyclopentadienyl skeleton via a C—C double bond of the heterocycle. Heterocycles containing one heteroatom are preferably 2,3- or b-fused.

Examples of cyclopentadienyl systems Cp containing a fused heteroaromatic are thiapentalene, 2-methyl-thiapentalene, 2-ethylthiapentalene, 2-isopropylthiapentalene, 2-n-butylthiapentalene, 2-tert-butylthiapentalene, 2-trimethylsilylthiapentalene, 2-phenylthiapentalene, 2-naphthylthiapentalene, 3-methylthiopentalene, 4-phenyl-2,6-dimethyl-1-thiopentalene, 4-phenyl-2,6-diethyl-1-thiopentalene, 4-phenyl-2,6-diisopropyl-1-thiopentalene, 4-phenyl-2,6-di-n-butyl-1-thiopentalene, 4-phenyl-2,6-di-trimethylsilyl-1-thio-pentalene, azapentalene, 2-methylazapentalene, 2-ethyl-azapentalene, 2-isopropylazapentalene, 2-n-butylazapentalene, 2-trimethylsilylazapentalene, 2-phenylazapentalene, 2-naphthylazapentalene, 1-phenyl-2,5-dimethyl-1-azapentalene, 1-phenyl-2,5-diethyl-1-azapentalene, 1-phenyl-2,5-di-n-butyl-1-azapentalene, 1-phenyl-2,5-di-tert-butyl-1-azapentalene, 1-phenyl-2,5-di-trimethylsilyl-1-azapentalene, 1-tert-butyl-2,5-dimethyl-1-azapentalene, oxapentalene, phosphapentalene, 1-phenyl-2,5-dimethyl-1-phospha-pentalene, 1-phenyl-2,5-diethyl-1-phosphapentalene, 1-phenyl-2,5-di-n-butyl-1-phosphapentalene, 1-phenyl-2,5-di-tert-butyl-1-phosphapentalene, 1-phenyl-2,5-di-trimethylsilyl-1-phosphapentalene, 1-methyl-2,5-dimethyl-1-phosphapentalene, 1-tert-butyl-2,5-dimethyl-1-phosphapentalene, 7-cyclopenta[1,2]thiophene[3,4]-cyclopentadienes or 7-cyclopenta[1,2]pyrrole[3,4]-cyclopentadienes.

In further preferred cyclopentadienyl systems Cp, four of the radicals $R^{1A}$-$R^{5A}$, i.e. two pairs of vicinal radicals, form two heteroaromatics. The heteroaromatic systems are as described in more detail above. Examples of cyclopentadienyl systems Cp containing two fused heterocycles are 7-cyclopentadithiophene, 7-cyclopentadipyrrole or 7-cyclopentadiphosphole.

The synthesis of such cyclopentadienyl systems Cp is described, for example, in the above-mentioned WO 98/22486. In "metalorganic catalysts for synthesis and polymerisation", Springer Verlag 1999, Ewen et al. describe, on pages 150 ff., further syntheses of cyclopentadienyl systems Cp.

Variation of the substituents $R^{1A}$-$R^{5A}$ likewise enables the polymerization behavior of the metal complexes to be influenced. The number and type of substituents allows the access of the olefins to be polymerized to the metal atom M to be influenced. In this way, the activity and selectivity of the catalyst in respect of various monomers, in particular bulky monomers, can be modified. Since the substituents can also influence the rate of termination reactions of the growing polymer chain, they also allow the molecular weight of the polymers formed to be altered. The chemical structure of the substituents $R^{1A}$ to $R^{5A}$ can therefore be varied within a wide range in order to achieve the desired results and obtain a tailored catalyst system, where 1 organic radical $R^{1A}$-$R^{5A}$ is —Z-A or A. Examples of possible carboorganic substituents $R^{1A}$-$R^{5A}$ are: $C_1$-$C_{20}$-alkyl which may be linear or branched, e.g. methyl, ethyl, n-propyl, isopropyl, n-butyl, isobutyl, tert-butyl, n-benzyl, n-hexyl, n-heptyl, n-octyl, n-nonyl, n-decyl or n-dodecyl, 5- to 7-membered cycloalkyl which may in turn bear a $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{20}$-alkenyl which may be linear, cyclic or branched and can have an internal or terminal double bond, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{20}$-aryl which may bear further alkyl groups as substituents, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or aralkyl which may bear further alkyl groups as substituents, e.g. benzyl, o-, m-, p-methylbenzyl, f- or 2-ethylphenyl, where two $R^{1A}$ to $R^{5A}$ may also be joined to form a 5- or 6-membered ring and the organic radicals $R^{1A}$-$R^{5A}$ may also be substituted by halogens, e.g. fluorine, chlorine or bromine. Possible organosilicon substituents $SiR^{6A}_3$ can bear radicals $R^{6A}$ which are the same as those described above for $R^{1A}$-$R^{5A}$, where two $R^{6A}$ may also be joined to form a 5- or 6-membered ring, e.g. trimethylsilyl, triethylsilyl, butyldimethylsilyl, tributylsilyl, triallylsilyl, triphenylsilyl or dimethylphenylsilyl. Preferred radicals $R^{1A}$-$R^{5A}$ are hydrogen, methyl, ethyl, n-propyl, isopropyl, n-butyl, isobutyl, tert-butyl, n-pentyl, n-hexyl, n-heptyl, n-octyl, vinyl, allyl, benzyl, phenyl, ortho-dialkyl- or ortho-dichloro-substituted phenyls, trialkyl- or trichloro-substituted phenyls, naphthyl, biphenyl and anthranyl. Particularly useful organosilicon substituents are trialkylsilyl groups having from 1 to 10 carbon atoms in the alkyl radical, in particular trimethylsilyl groups. Preference is also given to compounds in which two vicinal radicals $R^{1A}$-$R^{5A}$ form a fused ring system, i.e. together with the $E^{1A}$-$E^{5A}$ skeleton, preferably $C_5$-cyclopentadienyl skeleton, form, for example, an unsubstituted or substituted indenyl, benzindenyl or tetrahydroindenyl system.

As in the case of metallocenes, the metal complexes can be chiral. Thus, one of the substituents $R^{1A}$-$R^{5A}$ of the basic cyclopentadienyl skeleton can have one or more chiral centers, or the cyclopentadienyl system Cp can itself be enantiotopic so that chirality is induced only when it is bound to the transition metal M (for the formalisms employed for the chirality of cyclopentadienyl compounds, see R. Halterman, Chem. Rev. 92, (1992), 965-994).

M is a metal of group 3, 4, 5 or 6 of the Periodic Table, for example scandium, yttrium, titanium, zirconium, hafnium, vanadium, molybdenum, tantalum, chromium or tungsten. Very particular preference is given to M being titanium or chromium. The metal complexes, in particular the chromium complexes, can be obtained in a simple manner by reacting the corresponding metal salts, e.g. metal chlorides, with the ligand anion (e.g. using a procedure analogous to the examples in DE 197 10615).

The ligands X are determined, for example, by the choice of the corresponding starting metal compounds used for the synthesis of the metal complexes, but can also be changed subsequently. Possible ligands X are, in particular, the halogens fluorine, chlorine, bromine or iodine, in particular chlorine. Alkyl radicals such as methyl, ethyl, propyl, butyl, vinyl, allyl, phenyl and benzyl are also advantageous ligands X. Further ligands X which may be mentioned by way of example and do not constitute an exhaustive listing are trifluoroacetate, $BF_4^-$, $PF_6^-$ and also weakly coordinating or noncoordinating anions (cf., for example, S. Strauss in Chem. Rev. 1993, 93, 927-942), for example $B(C_6F_5)_4^-$.

Amides, alkoxides and sulfonates are particularly useful ligands X. Varying the radicals $R^6$ and $R^7$ enables, for example, fine adjustments to be made to physical properties such as solubility. Examples of possible carboorganic substituents $R^6$-$R^7$ are the following: $C_1$-$C_{20}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_6$-$C_{10}$-aryl group as substituent, e.g. cyclopropane, cyclo-butane, cyclopentane, cyclohexane, cycloheptane, cyclo-octane, cyclononane or cyclododecane, $C_2$-$C_{20}$-alkenyl which may be linear, cyclic or branched and have an internal or terminal double bond, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{20}$-aryl which may bear further alkyl groups as substituents, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may bear further alkyl groups as substituents, e.g. benzyl, o-, m-, p-methylbenzyl, 1- or 2-ethylphenyl, where $R^6$ may also be joined to $R^7$ to form a 5- or 6-membered ring and the organic radicals $R^6$-$R^7$ may also be substituted by halogens such as fluorine, chlorine or bromine. Possible radicals $R^8$ in an organosilicon substituent $SiR^8_3$ can be the same radicals as described in more detail above for $R^6$-$R^7$, where two $R^8$ may also be joined to form a 5- or 6-membered ring, e.g. trimethylsilyl, triethylsilyl, butyldimethylsilyl, tributylsilyl, triallylsilyl, triphenylsilyl or dimethylphenylsilyl. Preference is given to using $C_1$-$C_{10}$-alkyl such as methyl, ethyl, n-propyl, n-butyl, tert-butyl, n-pentyl, n-hexyl, n-heptyl, n-octyl, and also vinyl, allyl, benzyl and phenyl as radicals $R^6$ and $R^7$. Very particular preference is given to using some of the substituted ligands X since they can be obtained from cheap and readily available starting materials. Thus, a particularly preferred embodiment is obtained when X is dimethylamide, methoxide, ethoxide, isopropoxide, phenoxide, naphthoxide, triflate or p-toluenesulfonate.

The number k of the ligands X depends on the oxidation state of the transition metal M. The number k can therefore not be given as a generally applicable figure. The oxidation states of the transition metals M in catalytically active complexes are mostly known to those skilled in the art. Chromium, molybdenum and tungsten are very probably present in the oxidation state +3. However, it is also possible to use complexes whose oxidation state does not correspond to that of the active catalyst. Such complexes can then be appropriately reduced or oxidized by means of suitable activators. Preference is given to using chromium complexes in the oxidation state +3 and titanium complexes in the oxidation state 3 or 4.

A can be an imino group $C=NR^5$ or an unsubstituted, substituted or fused, heteroaromatic ring system. In preferred imino groups, the radical $R^5$ is a $C_1$-$C_{20}$-alkyl radical which may be linear or branched, e.g. methylimine, ethylimine, n-propylimine, isopropylimine, n-butylimine, isobutylimine, tert-butylimine, n-pentyl-imine, n-hexylimine, n-heptylimine, n-octylimine, n-nonylimine, n-decylimine or n-dodecylimine, a 5- to 7-membered cycloalkyl radical which may in turn bear a $C_6$-$C_{10}$-aryl group as substituent, e.g. cyclopropylimine, cyclobutylimine, cyclopentylimine, cyclohexylimine, cycloheptylimine, cyclooctylimine, cyclononylimine or cyclododecylimine, a $C_6$-$C_{20}$-aryl radical which may be of further alkyl groups as substituents, e.g. phenylimine, naphthylimine, biphenylimine, anthranylimine, o-, m-, p-methylphenylimine, 2,3-, 2,4-, 2,5- or 2,6-dimethylphenylimine, 2,3,4-, 2,3,5-, 2,3,6-, 2,4,5-, 2,4,6- or 3,4,5-trimethylphenylimine, or an arylalkyl radical which may be of further alkyl groups as substituents, e.g. benzylimine, o-, m-, p-methylbenzylimine, 1- or 2-ethylphenylimine, where the organic radical $R^5$ may also be substituted by halogens such as fluorine, chlorine or bromine. In particularly preferred imino groups, the radical $R^5$ is a $C_6$-$C_{20}$-aryl radical.

A is preferably an unsubstituted, substituted or fused, heteroaromatic ring system which can contain heteroatoms selected from the group consisting of oxygen, sulfur, nitrogen and phosphorus in addition to the carbon ring members. Examples of 5-membered ring heteroaryl groups which contain from one to four nitrogen atoms or from one to three nitrogen atoms and/or a sulfur or oxygen atom as ring members in addition to carbon atoms are 2-furyl, 2-thienyl, 2-pyrrolyl, 3-isoxazolyl, 5-isoxazolyl, 3-isothiazolyl, 5-isothiazolyl, 1-pyrazolyl, 3-pyrazolyl, 5-pyrazolyl, 2-oxazolyl, 4-oxazolyl, 5-oxazolyl, 2-thiazolyl, 4-thiazolyl, 5-thiazolyl, 2-imidazolyl, 4-imidazolyl, 5-imidazolyl, 1,2,4-oxadiazol-3-yl, 1,2,4-oxadiazol-5-yl, 1,3,4-oxadiazol-2-yl or 1,2,4-triazol-3-yl. Examples of 6-membered heteroaryl groups which can contain from 1 to 4 nitrogen atoms and/or a phosphorus atom are 2-pyridinyl, 2-phosphabenzolyl, 3-pyridazinyl, 2-pyrimidinyl, 4-pyrimidinyl, 2-pyrazinyl, 1,3,5-triazin-2-yl and 1,2,4-triazin-3-yl, 1,2,4-triazin-5-yl or 1,2,4-triazin-6-yl. The 5- and 6-membered ring heteroaryl groups may also be substituted by $C_1$-$C_{10}$-alkyl, $C_6$-$C_{10}$-aryl, alkylaryl having from 1 to 10 carbon atoms in the alkyl part and 6-10 carbon atoms in the aryl part, trialkylsilyl or halogens such as fluorine, chlorine, bromine or be fused with one or more aromatics or heteroaromatics. Examples of benzo-fused 5-membered heteroaryl groups are 2-indolyl, 7-indolyl, 2-coumaronyl, 7-coumaronyl, 2-thianaphthenyl, 7-thianaphthenyl, 3-indazolyl, 7-indazolyl, 2-benzimidazolyl and 7-benzimidazolyl. Examples of benzo-fused 6-membered heteroaryl groups are 2-quinolyl, 8-quinolyl, 3-cinnolyl, 8-cinnolyl, 1-phthalazlyl, 2-quinazolyl, 4-quinazolyl, 8-quinazolyl, 5-quinoxalyl, 4-acridyl, 1-phenanthridyl and 1-phenazyl. Among these heteroaromatic systems, particular preference is given to substituted and unsubstituted 2-pyridyl and 8-quinolyl.

The bridge Z between the cyclopentadienyl system Cp and the functional group A is an organic diradical comprising carbon and/or silicon units and having a chain length of from 1 to 5. Z can be bound to the basic cyclopentadienyl skeleton or to the heterocycle. Z is preferably bound to the cyclopentadienyl skeleton. Changing the length of the linkage between the cyclo-pentadienyl system and the heteroatom donor A enables the activity of the catalyst to be influenced. Preferred Z are

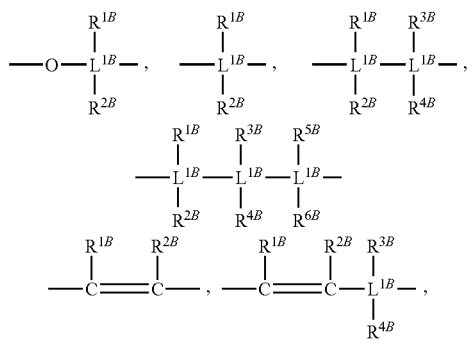

$=BR^{1B}$, $=BNR^{1B}R^{2B}$, $=AlR^{1B}$, —Ge—, —Sn—, —O—, —S—, $=SO$, $=SO_2$, $=NR^{1B}$, $=CO$, $=PR^{1B}$ or $=P(O)R^{1B}$ where $R^{1B}$-$R^{6B}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part, $SiR^{7B}{}_3$, where the organic radicals $R^{1B}$-$R^{6B}$ may also be substituted by halogens and two radicals $R^{1B}$-$R^{6B}$ may also be joined to form a five- or six-membered ring, $R^{7B}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part and two radicals $R^{7B}$ may also be joined to form a five- or six-membered ring, and $L^{1B}$ is carbon, silicon or germanium, preferably carbon or silicon.

Possible substituents $R^1$ to $R^{6B}$ are the same radicals as described for $R^1$ or hydrogen where two geminal or vicinal radicals $R^{1B}$ to $R^{6B}$ may also be joined to form a 5- or 6-membered ring and may also be substituted by halogens such as fluorine, chlorine or bromine. Preferred radicals $R^{1B}$ to $R^{6B}$ are hydrogen, methyl, ethyl, n-propyl, isopropyl, n-butyl, tert-butyl, n-pentyl, n-hexyl, n-heptyl, n-octyl, vinyl, allyl, benzyl, phenyl, naphthyl, biphenyl and anthranyl. Possible organosilicon substituents are, in particular, trialkylsilyl groups having from 1 to 10 carbon atoms in the alkyl radical, especially trimethylsilyl groups.

In preferred monocyclopentadienyl complexes A), the cyclopentadienyl system Cp and —Z-A form a ligand (Cp)(—$Z_m$-A) of the formula F-III:

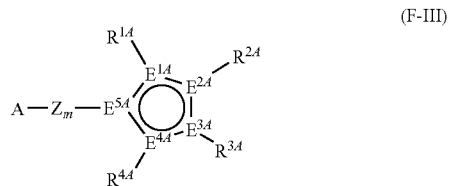

(F-III)

where the variables A, Z, m, $E^{1A}$ to $E^{5A}$ and $R^{6A}$ are as defined above and their preferred embodiments are also preferred here and $R^{1A}$-$R^{5A}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part, $SiR^{6A}{}_3$, where the organic radicals $R^{1A}$-$R^{5A}$ may also be substituted by halogens and two vicinal radicals $R^{1A}$-$R^{5A}$ may also be joined to form a five- or six-membered ring, and/or two vicinal radicals $R^{1A}$-$R^{5A}$ are joined to form a heteroaromatic which contains at least one atom from the group consisting of N, P, O and S.

The embodiments and preferred embodiments described above likewise apply to $R^{1A}$-$R^{5A}$.

A further preferred embodiment of these metal complexes comprises those in which A is an unsubstituted, substituted or fused, heteroaromatic ring system and Z is

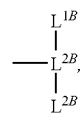

where $L^{2B}$ are each, independently of one another, carbon or silicon, $R^{1B}$-$R^{2B}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl radical and 6-20 carbon atoms in the aryl radical or $SiR^{7B}{}_3$, where the organic radicals $R^{1B}$-$R^{2B}$ may also be substituted by halogens and two radicals $R^{1B}$-$R^{2B}$ may also be joined to form a five- or six-membered ring and $R^{7B}$ are each, independently of one another, hydrogen, $C_1$-$C_{20}$-alkyl, $C_2$-$C_{20}$-alkenyl, $C_6$-$C_{20}$-aryl or alkylaryl having from 1 to 10 carbon atoms in the alkyl radical and 6-20 carbon atoms in the aryl radical and two radicals $R^{7B}$ may also be joined to form a five- or six-membered ring, and m is 0 or 1.

The above-described embodiments and preferred embodiments for $R^{1B}$-$R^{2B}$ and $R^{7B}$ also apply to these preferred metal complexes.

In the process of the present invention, particular preference is given to metal complexes A) of the formula (Cp)(—$Z_m$-A)MX$_k$, where A is selected from the group consisting of 2-pyridyl, 8-quinolyl

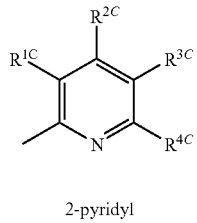
2-pyridyl

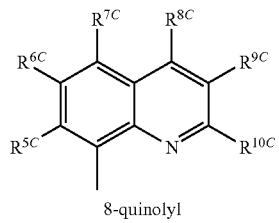
8-quinolyl where $R^{1C}$-$R^{10C}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part or $SiR^{11C}_3$, where the organic radicals $R^{1C}$-$R^{10C}$ may also be substituted by halogens and two vicinal radicals $R^{1C}$-$R^{10C}$ may also be joined to form a five- or six-membered ring and $R^{11C}$ are each, independently of one another, hydrogen, $C_1$-$C_{20}$-alkyl, $C_2$-$C_{20}$-alkenyl, $C_6$-$C_{20}$-aryl or alkylaryl having from 1 to 10 carbon atoms in the alkyl part and 6-20 carbon atoms in the aryl part and two radicals $R^{11C}$ may also be joined to form a five- or six-membered ring.

In particular, m is 0 for 8-quinolyl and m is 1 for 2-pyridyl in these metal complexes A).

Possible substituents $R^{1C}$ to $R^{10C}$ are the same radicals as described for $R^{1A}$, where two vicinal radicals $R^{1C}$ to $R^{10C}$ may also be joined to form a 5- or 6-membered ring and may also be substituted by halogens such as fluorine, chlorine or bromine. Preferred radicals $R^{1C}$ to $R^{10C}$ are hydrogen, methyl, ethyl, n-propyl, isopropyl, n-butyl, tert-butyl, n-pentyl, n-hexyl, n-heptyl, n-octyl, benzyl, phenyl, naphthyl, biphenyl and anthranyl. Particularly useful organosilicon substituents are trialkylsilyl groups having from 1 to 10 carbon atoms in the alkyl radical, in particular trimethylsilyl groups.

Metal complexes which are very particularly readily available and thus preferred also include ones without a bridge Z in which m is 0 and A is an unsubstituted or substituted 8-quinolyl. In these complexes, $R^{5C}$ to $R^{10C}$ are preferably hydrogen, or $R^{5C}$ to $R^{9C}$ are each hydrogen and $R^{10C}$ is methyl, ethyl, n-propyl, isopropyl, n-butyl, tert-butyl, n-pentyl, n-hexyl, n-heptyl, n-octyl, benzyl, phenyl, naphthyl, biphenyl or anthranyl. These are simple to prepare and at the same time display very high activities.

In a preferred embodiment, M is chromium. A is very particularly preferably an unsubstituted or substituted, e.g. alkyl-substituted, quinolyl, in particular one bound in the 8 position, e.g. 8-quinolyl, 8-(2-methylquinolyl), 8-(2,3,4-trimethylquinolyl) or 8-(2,3,4,5,6,7-hexamethylquinolyl). Preferred metal complexes of this type are 1-(8-quinolyl)-2-methyl-4-methylcyclopentadienylchromium(III) dichloride, 1-(8-quinolyl)-3-isopropyl-5-methylcyclopentadienylchromium-(III) dichloride, 1-(8-quinolyl)-3-tert-butyl-5-methyl-cyclopentadienylchromium(III) dichloride, 1-(8-quinolyl)-2,3,4,5-tetramethylcyclopentadienylchromium(III) dichloride, 1-(8-quinolyl)tetrahydroindenylchromium(III) dichloride, 1-(8-quinolyl)indenylchromium(III) dichloride, 1-(8-quinolyl)-2-methylindenylchromium(III) dichloride, 1-(8-quinolyl)-2-isopropylindenylchromium-(III) dichloride, 1-(8-quinolyl)-2-ethylindenylchromium-(III) dichloride, 1-(8-quinolyl)-2-tert-butylindenyl-chromium(III) dichloride, 1-(8-quinolyl)benzindenyl-chromium(III) dichloride, 1-(8-quinolyl)-2-benzindenylchromium(III) dichloride, 1-(8-(2-methyl-quinolyl))-2-methyl-4-methylcyclopentadienylchromium(III) dichloride, 1-(8-(2-methylquinolyl))-2,3,4,5-tetramethyl-cyclopentadienylchromium(III) dichloride, 1-(8-(2-methylquinolyl))tetrahydroindenylchromium(III) di-chloride, 1-(8-(2-methylquinolyl))indenylchromium(III) dichloride, 1-(8-(2-methylquinolyl))-2-methylindenyl-chromium(III) dichloride, 1-(8-(2-methylquinolyl))-2-isopropyl-indenylchromium(III) dichloride, 1-(8-(2-methyl-quinolyl)-2-ethylindenylchromium(III) dichloride, 1-(8-(2-methylquinolyl))-2-tert-butylindenylchromium(III) dichloride, 1-(8-(2-methylquinolyl))benzindenylchromium-(III) dichloride or 1-(8-(2-methylquinolyl))-2-methyl-benzindenylchromium(III) dichloride.

The preparation of such functional cyclopentadienyl ligands has been known for a long time. Various synthetic routes to these complexing ligands are described, for example, by M. Enders et al. in Chem. Ber. (1996), 129, 459-463 or P. Jutzi and U. Siemeling in J. Orgmet. Chem. (1995), 500, 175-185.

The metal complexes, in particular the chromium complexes, can be obtained in a simple manner by reacting the appropriate metal salts, e.g. metal chlorides, with the ligand anion (e.g. using a procedure analogous to the examples in DE-A-19710615).

Examples of further suitable metal complexes are transition metal complexes containing at least one ligand of the formulae F XV to F XIX,

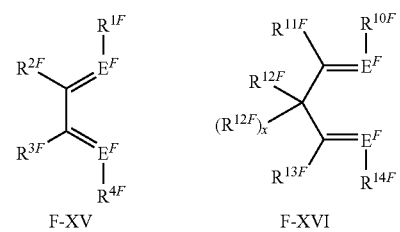
F-XV  F-XVI

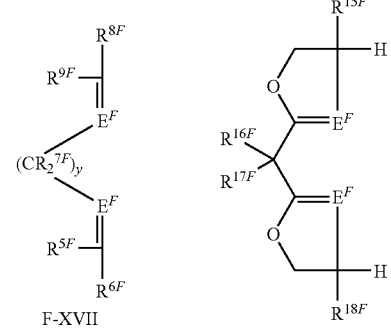
F-XVII

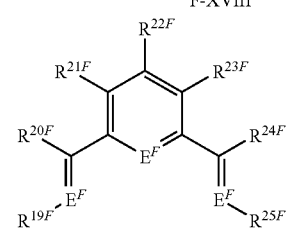
F-XVIII

F-XIX where the transition metal is selected from among the elements Ti, Zr, Hf, Sc, V, Nb, Ta, Cr, Mo, W, Fe, Co, Ni, Pd, Pt and elements of the rare earth metals. Preference is here given to compounds having nickel, iron, cobalt or palladium as central metal.

$E^F$ is an element of group 15 of the Periodic Table of the Elements, preferably N or P, with N being particularly preferred. The two or three atoms $E^F$ in a molecule can be identical or different.

The radicals $R^{1F}$ to $R^{25F}$, which may be identical or different within a ligand system F-XV to F-XIX, are the following groups:

$R^{1F}$ and $R^{4F}$ are each, independently of one another, a hydrocarbon radical or substituted hydrocarbon radical, preferably a hydrocarbon radical in which the carbon atom adjacent to the element $E^F$ is bound to at least two carbon atoms, $R^{2F}$ and $R^{3F}$ are each, independently of one another, hydrogen, a hydrocarbon radical or a substituted hydrocarbon radical, where $R^{2F}$ and $R^{3F}$ may also together form a ring system in which one or more heteroatoms may be present, $R^{6F}$ and $R^{8F}$ are each, independently of one another, a hydrocarbon radical or substituted hydrocarbon radical, $R^{5F}$ and $R^{9F}$ are each, independently of one another, hydrogen, a hydrocarbon radical or a substituted hydrocarbon radical, where $R^{6F}$ and $R^{5F}$ or $R^{8F}$ and $R^{9F}$ may also together form a ring system, $R^{7F}$ are each, independently of one another, hydrogen, a hydrocarbon radical or a substituted hydrocarbon radical, where two $R^{7F}$ may also together form a ring system, $R^{10F}$ and $R^{14F}$ are each, independently of one another, a hydrocarbon radical or substituted hydrocarbon radical, $R^{11F}$, $R^{12F}$, $R^{12F'}$ and $R^{13F}$ are each, independently of one another, hydrogen, a hydrocarbon radical or a substituted hydrocarbon radical, where two or more geminal or vicinal radicals $R^{11A}$, $R^{12A}$, $R^{12A'}$ and $R^{13A}$ may also together form a ring system, $R^{15F}$ and $R^{18F}$ are each, independently of one another, hydrogen, a hydrocarbon radical or a substituted hydrocarbon radical, $R^{16F}$ and $R^{17F}$ are each, independently of one another, hydrogen, a hydrocarbon radical or a substituted hydrocarbon radical, $R^{19F}$ and $R^{25F}$ are each, independently of one another, $C_2$-$C_{20}$-alkenyl, $C_6$-$C_{20}$-aryl, alkylaryl having from 1 to 10 carbon atoms in the alkyl part and 6-20 carbon atoms in the aryl part, where the organic radicals $R^{19F}$ and $R^{25F}$ may also be substituted by halogens, $R^{20F}$-$R^{24F}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part or $siR^{26F}_3$, where the organic radicals $R^{20F}$-$R^{24F}$ may also be substituted by halogens and two vicinal radicals $R^{20F}$-$R^{24F}$ may also be joined to form a five- or six-membered ring and $R^{26F}$ are each, independently of one another, hydrogen, $C_1$-$C_{20}$-alkyl, $C_2$-$C_{20}$-alkenyl, $C_6$-$C_{20}$-aryl or alkylaryl having from 1 to 10 carbon atoms in the alkyl part and 6-20 carbon atoms in the aryl part and two radicals $R^{26F}$ may also be joined to form a five- or six-membered ring, x is 0 or 1, with F-XVI being negatively charged when x is 0, and y is an integer from 1 to 4, preferably 2 or 3.

Metal complexes having Fe, Co, Ni, Pd or Pt as central metal and containing ligands of the formula F-XV are particularly useful. Particular preference is given to diimine complexes of Ni or Pd, e.g.:

di(2,6-di-1-propylphenyl)-2,3-dimethyldiazabutadiene-palladium dichloride, di(di-1-propylphenyl)-2,3-dimethyl-diazabutadienenickel dichloride, di(2,6-di-1-propylphenyl) dimethyldiazabutadienedimethylpalladium, di(2,6-di-1-propylphenyl)-2,3-dimethyldiazabutadiene-dimethylnickel, di(2,6-dimethylphenyl)-2,3-dimethyl-diazabutadienepalladium dichloride, di(2,6-dimethyl-phenyl)-2,3-dimethyldiazabutadienenickel dichloride, di(2,6-dimethylphenyl)-2,3-dimethyldiazabutadiene-dimethylpalladium, di(2,6-dimethylphenyl)-2,3-dimethyl-diazabutadienedimethylnickel, di(2-methylphenyl)-2,3-dimethyldiazabutadienepalladium dichloride, di(2-methylphenyl)-2,3-dimethyldiazabutadienenickel dichloride, di(2-methylphenyl)-2,3-dimethyldiazabuta-dienedimethylpalladium, di(2-methylphenyl)-2,3-dimethyl-diazabutadienedimethylnickel, diphenyl-2,3-dimethyldiaz-abutadienepalladium dichloride, diphenyl-2,3-dimethyldiazabutadienenickel dichloride, diphenyl-2,3-dimethyldiazabutadienedimethylpalladium, diphenyl-2,3-dimethyldiazabutadienedimethylnickel, di(2,6-dimethylphenyl)azanaphthenepalladium dichloride, di(2,6-dimethylphenyl)azanaphthenenickel dichloride, di(2,6-dimethylphenyl)azanaphthenedimethylpalladium, di(2,6-dimethylphenyl)azanaphthenedimethylnickel, 1,1'-bipyridylpalladium dichloride, 1,1'-bipyridyl-nickel dichloride, 1,1'-bipyridyldimethylpalladium and 1,1'-bipyridyldimethylnickel.

Especially useful metal complexes include those comprising a metal of group 6 or 7 of the Periodic Table and a ligand of the formula F-XIX

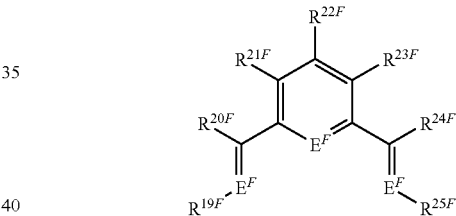

where $E^F$ is N or P, preferably N, $R^{19F}$ and $R^{25F}$ are each, independently of one another, $C_2$-$C_{20}$-alkenyl, $C_6$-$C_{20}$-aryl, alkylaryl having from 1 to 10 carbon atoms in the alkyl part and 6-20 carbon atoms in the aryl part, where the organic radicals $R^{19F}$ and $R^{25F}$ may also be substituted by halogens, $R^{20F}$-$R^{29F}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part or $SiR^{26F}_3$, where the organic radicals $R^{20F}$-$R^{24F}$ may also be substituted by halogens and two vicinal radicals $R^{20F}$-$R^{24F}$ may also be joined to form a five- or six-membered ring and $R^{26F}$ are each, independently of one another, hydrogen, $C_1$-$C_{20}$-alkyl, $C_2$-$C_{20}$-alkenyl, $C_6$-$C_{20}$-aryl or alkylaryl having from 1 to 10 carbon atoms in the alkyl radical and 6-20 carbon atoms in the aryl radical and two radicals $R^{26F}$ may also be joined to form a five- or six-membered ring.

Particularly useful compounds F-XIX also include those described in J. Am. Chem. Soc. 120, p. 4049 ff. (1998), J. Chem. Soc., Chem. Commun. 1998, 849, and WO 98/27124. $R^{19F}$ and $R^{25F}$ in F-XIX are preferably phenyl, naphthyl, biphenyl, anthranyl, o-, m-, p-methylphenyl, 2,3-, 2,4-, 2,5- or 2,6-dimethylphenyl, -dichlorophenyl or -dibromophenyl, 2-chloro-6-methylphenyl, 2,3,4-, 2,3,5-, 2,3,6-, 2,4,5-, 2,4,6- or 3,4,5-trimethylphenyl, in particular 2,3- or 2,6-dimethylphenyl, -diisopropylphenyl, -dichlorophenyl or -dibromophenyl and 2,4,6-trimethylphenyl. At the same time, $R^{20F}$ and $R^{24F}$ are preferably hydrogen, methyl, ethyl, n-propyl, isopropyl, n-butyl, tert-butyl, n-pentyl, n-hexyl, n-heptyl, n-octyl, benzyl or phenyl, in particular hydrogen or methyl. $R^{21F}$ and $R^{23F}$ are preferably hydrogen and $R^{22F}$ is preferably hydrogen, methyl, ethyl or phenyl, in particular hydrogen. Preference is given to complexes of the ligands F-XIX with the transition metals Fe, Co or Ni, in particular Fe. Particularly preferred metal complexes are 2,6-diacetylpyridinebis(2,4-dimethylphenylimine)iron dichloride, 2,6-diactylpyridinebis(2,4,6-trimethyl-phenylimine)iron dichloride, 2,6-diacetylpyridinebis-(2-chloro-6-methylphenylimine)iron dichloride, 2,6-diacetylpyridinebis(2,6-diisopropylphenylimine)iron dichloride, 2,6-diacetylpyridinebis(2,6-dichlorophenyl-imine)iron dichloride, 2,6-pyridinedicarboxaldehyde-bis(2,6-diisopropylphenylimine) iron dichloride, 2,6-diacetylpyridinebis(2,4-dimethylphenylimine)cobalt dichloride, 2,6-diactylpyridinebis(2,4,6-trimethyl-phenylimine)cobalt dichloride, 2,6-diacetylpyridine-bis(2-chloro-6-methylphenylimine)cobalt dichloride, 2,6-diacetylpyridinebis(2,6-diisopropylphenylimine)-cobalt dichloride, 2,6-diacetylpyridinebis-(2,6-dichlorophenylimine)cobalt dichloride and 2,6-pyridinedicarboxaldehydebis(2,6-diisopropylphenyl-imine) cobalt dichloride.

The metal complexes are reacted with a compound of the formula F-I in which $M^1$ is preferably lithium, sodium, potassium or magnesium, particularly preferably lithium.

The substituents $R^3$ are as defined above for $R^1$ and are preferably methyl, ethyl, n-propyl, isopropyl, n-butyl, isobutyl, tert-butyl, n-pentyl, n-hexyl, n-heptyl, n-octyl, vinyl, allyl, benzyl, phenyl, ortho-dialkyl- or ortho-dichloro-substituted phenyls, trialkyl- or trichloro-substituted phenyls, naphthyl, biphenyl and anthranyl.

The substituents $R^4$ are as defined for $R^3$ and can also be hydrogen, halogen or alkoxy having from 1 to 10 carbon atoms in the alkyl radical. $R^4$ is preferably as defined for $R^3$ or halogen or alkoxy, particularly preferably as defined for $R^3$.

Particularly preferred compounds of the formula (F-I) are methyllithium, ethyllithium, n-butyllithium, phenyllithium, benzyllithium, methylmagnesium chloride, methylmagnesium bromide, ethylmagnesium chloride, ethylmagnesium bromide, butylmagnesium chloride, dimethylmagnesium, diethylmagnesium, dibutylmagnesium and dipentylmagnesium.

It is also possible to use mixtures of various compounds F-I.

The compound of the formula F-I is preferably present in the catalyst system in such an amount that the molar ratio of $M^1$ to metal complex is from 100:1 to 0.1:1, preferably from 10:1 to 0.2:1 and particularly preferably from 1:1 to 0.5:1.

The compound of the formula F-I is usually added to the metal complex prior to the polymerization or during the polymerization. If it is added prior to the polymerization, this is usually carried out from 1 minute to 5 hours before commencement of the polymerization, preferably from 5 minutes to 2 hours before commencement of the polymerization and particularly preferably from 10 minutes to 1 hour before commencement of the polymerization. Particular preference is given to a process in which the metal complex is reacted with the compound of the formula F-I during the polymerization.

In the process of the present invention, the metal complexes A) can be used together with further components as a catalyst system for olefin polymerization. The catalyst system may further comprise
B) optionally an organic or inorganic support,
C) optionally one or more cation-forming compounds or
D) optionally one or more metal compounds of group 13 of the Periodic Table.

To enable the metal complexes to be used in polymerization processes in the gas phase or in suspension, it is often advantageous for them to be used in the form of a solid, i.e. for them to be applied to a solid support B). Furthermore, the supported metal complexes display a high productivity. The metal complexes can therefore also optionally be immobilized on an organic or inorganic support B) and be used in supported form in the polymerization. This is a customary method of avoiding deposits in the reactor and of controlling the polymer morphology. As support materials, preference is given to using silica gel, magnesium chloride, aluminum oxide, mesoporous materials, aluminosilicates, hydrotalcites and organic polymers such as polyethylene, polypropylene or polystyrene. Preference is given to the metal complex being immobilized on a support.

As solid support materials B) for catalysts for olefin polymerization, preference is given to using silica gels since particles whose size and structure make them suitable as supports for olefin polymerization can be produced from this material. Spray-dried silica gels, which are spherical agglomerates of smaller granular particles, known as primary particles, have been found to be particularly useful. The silica gels can be dried and/or calcined before use.

Likewise preferred supports B) are hydrotalcites and calcined hydrotalcites. In mineralogy, hydrotalcite is a natural mineral which has the ideal formula

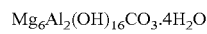

$$Mg_6Al_2(OH)_{16}CO_3 \cdot 4H_2O$$

and whose structure is derived from that of brucite $Mg(OH)_2$. Brucite crystallizes in a layer structure in which the metal ions are located in octahedral holes between two layers of close-packed hydroxyl ions, with every second layer of the octahedral holes being occupied. In hydrotalcite, some magnesium ions are replaced by aluminum ions, with the set of layers acquiring a positive charge. This is compensated by anions which together with water of crystallization are located in the intermediate layers.

Such layer structures are found not only in the case of magnesium-aluminum hydroxides, but generally in mixed metal hydroxides having a layer structure and the formula

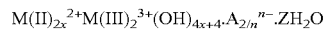

$$M(II)_{2x}{}^{2+}M(III)_2{}^{3+}(OH)_{4x+4} \cdot A_{2/n}{}^{n-} \cdot zH_2O$$

where M(II) is a divalent metal such as Mg, Zn, Cu, Ni, Co, Mn, Ca and/or Fe and M(III) is a trivalent metal such as Al, Fe, Co, Mn, La, Ce and/or Cr, x is a number from 0.5 to 10 in steps of 0.5, A is an interstitial anion and n is the charge on the interstitial anion, which may be from 1 to 8, usually from 1 to 4, and z is an integer from 1 to 6, in particular from 2 to 4. Possible interstitial anions are organic anions such as alkoxide anions, alkyl ether sulfates, aryl ether sulfates or glycol ether sulfates, inorganic anions such as, in particular, carbonate, hydrogencarbonate, nitrate, chloride, sulfate or $B(OH)_4{}^-$ or polyoxo metal anions such as $Mo_7O_{24}{}^{6-}$ or $V_{10}O_{28}{}^{6-}$. However, a mixture of a plurality of such anions may also be present;

Accordingly, all such mixed metal hydroxides having a layer structure are regarded as hydrotalcites for the purposes of the present invention.

Hydrotalcites can be converted by calcination, i.e. heating, into calcined hydrotalcites, which enables, inter alia, the desired hydroxyl group content to be set. In addition, the crystal structure also changes. The preparation of the calcined hydrotalcites used according to the present invention is usually carried out at above 180° C. Preference is given to calcination for from 3 to 24 hours at from 250° C. to 1000° C., in particular from 400° C. to 700° C. Simultaneously passing air or inert gas over the material being calcined or application of vacuum is also possible.

On heating, the natural or synthetic hydrotalcites firstly give off water, i.e. drying occurs. On further heating, the actual calcination process, the metal hydroxides eliminate hydroxyl groups and interstitial anions to form metal oxides, with OH groups or interstitial anions such as carbonate still being able to be present in the calcined hydrotalcites. A measure of this is the loss on ignition. This is the weight loss experienced by a sample which is heated in two steps, firstly for 30 minutes at 200° C. in a drying oven and then for 1 hour at 950° C. in a muffle furnace.

The calcined hydrotalcites used as component B) are thus mixed oxides of divalent and trivalent metals M(II) and M(III), with the molar ratio of M(II) to M(III) generally being in the range from 0.5 to 10, preferably from 0.75 to 8 and in particular from 1 to 4. Furthermore, normal levels of impurities, for example Si, Fe, Na, Ca or Ti, may also be present.

Preferred calcined hydrotalcites B) are mixed-oxides in which M(II) is magnesium and M(III) is aluminum. Such aluminum-magnesium mixed oxides are obtainable from Condea Chemie GmbH, Hamburg, under the trade name Puralox Mg.

Preference is also given to calcined hydrotalcites in which the structural transformation is complete or virtually complete. Calcination, i.e. a transformation of the structure, can be established, for example, by means of X-ray diffraction patterns.

The hydrotalcites, calcined hydrotalcites or silica gels used are generally employed as finely divided powders having a mean particle diameter $d_{50}$ of from 5 to 200 μm, preferably from 10 to 150 μm, particularly preferably from 15 to 100 μm, and in particular from 20 to 70 μm, and usually have pore volumes of from 0.1 to 10 cm$^3$/g, preferably from 0.2 to 5 cm$^3$/g, and specific surface areas of from 30 to 1000 m$^2$/g, preferably from 50 to 800 m$^2$/g and in particular from 100 to 600 m$^2$/g. The metal complexes are preferably applied in such an amount that the concentration of metal complexes in the finished catalyst system is from 10 to 2.00 μmol, preferably from 20 to 100 μmol and particularly preferably from 25 to 70 μmol, per g of support B).

Some of the metal complexes have only a low polymerization activity and are therefore brought into contact with an activator, viz. the component C), in order to be able to display a good polymerization activity. The catalyst system therefore optionally further comprises, as component C), one or more cation-forming compounds, preferably at least one cation-forming compound C).

Suitable cation-forming compounds C) which are able to react with the metal complexes to convert it into a cationic compound are, for example, aluminoxanes, strong uncharged Lewis acids, ionic compounds having a Lewis-acid cation or ionic compounds having a Brönsted acid as cation.

As aluminoxanes, it is possible to use, for example, the compounds described in WO 00/31090. Particularly useful compounds are open-chain or cyclic aluminoxane compounds of the formulae (F X) or (F XI)

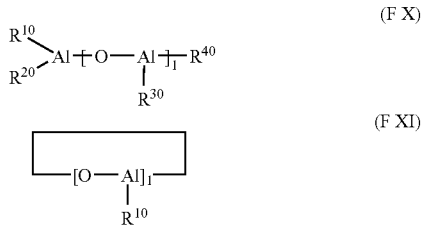

where $R^{1D}$-$R^{4D}$ are each, independently of one another, a $C_1$-$C_6$-alkyl group, preferably a methyl, ethyl, butyl or isobutyl group, and 1 is an integer from 1 to 30, preferably from 5 to 25.

A particularly useful aluminoxane compound is methylaluminoxane.

These oligomeric aluminoxane compounds are customarily prepared by controlled reaction of a solution of trialkylaluminum with water. The oligomeric aluminoxane compounds obtained in this way are generally in the form of mixtures of both linear and cyclic chain molecules of various lengths, so that 1 is to be regarded as a mean. The aluminoxane compounds can also be present in admixture with other metal alkyls, usually aluminum alkyls. Aluminoxane preparations suitable as component C) are commercially available.

Furthermore, modified aluminoxanes in which some of the hydrocarbon radicals in the formulae (F X) or (F XI) are replaced by hydrogen atoms or alkoxy, aryloxy, siloxy or amide groups can be used in place of the aluminoxane compounds of the formula (F X) or (F XI) as component C).

It has been found to be advantageous to use the metal complex and the aluminoxane compounds in such amounts that the atomic ratio of aluminum from the aluminoxane compounds, including any aluminum alkyl still present, to the transition metal from the metal complex is in the range from 10:1 to 1000:1, preferably from 20:1 to 500:1 and in particular from 30:1 to 400:1.

As strong, uncharged Lewis acids, preference is given to compounds of the formula (F XII)

$$M^{2D}X^{1D}X^{2D}X^{3D} \quad \text{(F XII)}$$

where
$M^{2D}$ is an element of group 13 of the Periodic Table of the Elements, in particular B, Al or Ga, preferably B,
$X^{1D}$, $X^{2D}$ and $X^{3D}$ are each hydrogen, $C_1$-$C_{10}$-alkyl, $C_6$-$C_{15}$-aryl, alkylaryl, arylalkyl, haloalkyl or haloaryl each having from 1 to 10 carbon atoms in the alkyl radical and from 6 to 20 carbon atoms in the aryl radical or fluorine, chlorine, bromine or iodine, in particular haloaryls, preferably pentafluorophenyl.

Further examples of strong, uncharged Lewis acids are mentioned in WO 00/31090.

Particularly useful compounds as component C) are boranes and boroxins, e.g. trialkylborane, triarylborane or trimethylboroxin. Particular preference is given to using boranes which bear at least two perfluorinated aryl radicals. Particular preference is given to compounds of the formula (F XII) in which $X^{1D}$, $X^{2D}$ and $X^{3D}$ are identical, preferably tris(pentafluorophenyl)borane.

Strong uncharged Lewis acids which are suitable as cation-forming compounds C) also include the reaction products from the reaction of a boronic acid with two equivalents of a trialkylaluminum or the reaction products from the reaction of a trialkylaluminum with two equivalents of acidic fluorinated, in particular perfluorinated, carbon compounds such as penta-fluorophenol or bis(pentafluorophenyl)borinic acid.

Suitable ionic compounds having Lewis-acid cations include salt-like compounds of the cation of the formula (F XIII)

$$[((M^{3D}))^{a+}Q_1Q_2\ldots Q_z]^{d+} \quad \text{(F XIII)}$$

where $M^{3D}$ is an element of groups 1 to 16 of the Periodic Table of the Elements, $Q_1$ to $Q_z$ are singly negatively charged groups such as $C_1$-$C_{28}$-alkyl, $C_6$-$C_{15}$-aryl, alkylaryl, arylalkyl, haloalkyl, haloaryl each having from 6 to 20 atoms in the aryl radical and from 1 to 28 carbon atoms in the alkyl radical, $C_3$-$C_{10}$-cycloalkyl which may bear $C_1$-$C_{10}$-alkyl groups as substituents; halogen, $C_1$-$C_{25}$-alkoxy, $C_6$-$C_{15}$-aryloxy, silyl or mercaptyl groups, a is an integer from 1 to 6 and z is an integer from 0 to 5, d is the difference a-z, but d is greater than or equal to 1.

Particularly useful cations are carbonium cations, oxonium cations and sulfonium cations and also cationic transition metal complexes. Particular mention may be made of the triphenylmethyl cation, the silver cation and the 1,1'-dimethylferrocenyl cation. They preferably have noncoordinating counterions, in particular boron compounds as are also mentioned in WO 91/09882, preferably tetrakis(pentafluorophenyl)borate.

The salts containing noncoordinating anions can also be prepared by combining a boron or aluminum compound, e.g. an aluminum alkyl, with a second compound which can react with the boron or aluminum compound so as to link two or more boron or aluminum atoms to one another, e.g. water, and a third compound which forms an ionizing ionic compound with the boron or aluminum compound, e.g. triphenylchloromethane. In addition, a fourth compound which likewise reacts with the boron or aluminum compound, e.g. pentafluorophenol, can be added.

Ionic compounds having Brönsted acids as cations preferably likewise have noncoordinating counterions. As Brönsted acid, particular preference is given to protonated amine or aniline derivatives. Preferred cations are N,N-dimethylanilinium, N,N-dimethylcyclohexylammonium and N,N-dimethylbenzylammonium and also derivatives of the latter two.

Compounds containing anionic boron heterocycles as are described in WO 9736937 are also suitable as component C), in particular dimethylaniliniumboratabenzenes or tritylboratabenzenes.

Preferred ionic compounds C) contain borates which bear at least two perfluorinated aryl radicals. Particular preference is given to N,N-dimethylanilinium tetrakis-(pentafluorophenyl)borate and in particular N,N-dimethylcyclohexylammonium tetrakis(pentafluorophenyl)-borate, N,N-dimethylbenzylammonium tetrakis(penta-fluorophenyl)borate or trityl tetrakis(pentafluorophenyl)borate.

Two or more borate anions can also be linked to one another, as in the dianion $[(C_6F_5)_2B\text{—}C_6F_4\text{—}B(C_6F_5)_2]^{2-}$, or the borate anion can be bound via a bridge comprising a suitable functional group to the support surface.

Further suitable cation-forming compounds C) are listed in WO 00/31090.

The amount of strong, uncharged Lewis acids, ionic compounds having Lewis-acid cations or ionic compounds having Brönsted acids as cations is preferably from 0.1 to 20 equivalents, more preferably from 1 to 10 equivalents, based on the metal complex.

Further suitable cation-forming compounds C) are boron-aluminum compounds such as di[bis(pentafluorophenyl-boroxy)]methylalane. Boron-aluminum compounds of this type are described, for example, in WO 99/06414.

It is also possible to use mixtures of all the abovementioned cation-forming compounds C). Preferred mixtures comprise aluminoxanes, in particular methyl-aluminoxane, and an ionic compound, in particular one containing the tetrakis (pentafluorophenyl)borate anion, and/or a strong, uncharged Lewis acid, in particular tris(pentafluorophenyl)borane.

Preference is given to using both the metal complexes and the cation-forming compounds C) in a solvent, with preference being given to aromatic hydrocarbons having from 6 to 20 carbon atoms, in particular xylenes, toluene, pentane, hexane, heptane or mixtures thereof.

In addition, the catalyst system may further comprise, as additional component D), a metal compound of the formula (F-XX)

$$M^G(R^{1G})_{r^G}(R^{2G})_{s^G}(R^{3G})_{t^G} \quad \text{(F-XX)}$$

where $M^G$ is boron, aluminum, gallium, indium or thallium, $R^{1G}$ is hydrogen, $C_1$-$C_{10}$-alkyl, $C_6$-$C_{15}$-aryl, alkylaryl or arylalkyl each having from 1 to 10 carbon atoms in the alkyl part and from 6 to 20 carbon atoms in the aryl part, $R^{2G}$ and $R^{3G}$ are each hydrogen, halogen, $C_1$-$C_{10}$-alkyl, $C_6$-$C_{15}$-aryl, alkylaryl, arylalkyl or alkoxy each having from 1 to 10 carbon atoms in the alkyl radical and from 6 to 20 carbon atoms in the aryl radical, $r^G$ is an integer from 1 to 3 and $s^G$ and $t^G$ are integers in the range from 0 to 2, where the sum $r^G+s^G+t^G$ corresponds to the valence of $M^G$, where the component D) is not identical to the component C). It is also possible to use mixtures of various metal compounds of the formula (F-XX).

Among the metal compounds of the formula (F-XX), preference is given to those in which $M^G$ is aluminium and $R^{2G}$ and $R^{3G}$ are each $C_1$-$C_{20}$-alkyl.

Particularly preferred metal compounds of the formula (F-XX) are tri-n-hexylaluminum, triisobutylaluminum, tri-n-butylaluminum, triethylaluminum, dimethylaluminum chloride, dimethylaluminum fluoride, methylaluminum dichloride, methylaluminum sesquichloride, diethylaluminum chloride and trimethylaluminum and mixtures thereof. The partial hydrolysis products of aluminum alkyls with alcohols can also be used.

When a metal compound D) is used, it is preferably present in the catalyst system in such an amount that the molar ratio of $M^G$ from formula (F-XX) to transition metal from the metal complex is from 2000:1 to 0.1:1, preferably from 800:1 to 0.2:1 and particularly preferably from 100:1 to 1:1.

To produce the catalyst systems of the present invention, preference is given to fixing at least one metal complex A) together with C) to the support B) by physisorption or by chemical reaction, i.e. covalent bonding of the components to the support surface by means of reactive groups. The order in which the support component B), metal complex A) and, if used, component C) are combined may be chosen freely. The metal complex A) and cation-forming compound C) can be added independently or simultaneously or in premixed form to B). After the individual process steps, the solid can be washed with suitable inert solvents such as aliphatic or aromatic hydrocarbons.

In a preferred embodiment, the metal complex A) is brought into contact with the cation-forming compound C) in a suitable solvent, usually giving a soluble reaction product, an adduct or a mixture. The preparation obtained in this way is then brought into contact with the support B), which may have been pretreated if appropriate, and the solvent is completely or partly removed. This preferably gives a solid in the form of a free-flowing powder. Examples of the industrial implementation of the above process are described in WO 96/00243, WO 98/40419 or WO 00/05277. A further preferred embodiment comprises firstly applying the cation-forming compound C) to the support B) and subsequently bringing this supported cation-forming compound into contact with the metal complex.

Preference is given to firstly bringing D) into contact with the alpha-olefin to be polymerized and subsequently adding the catalyst solid derived from the metal complex A) and the components B) and C) as described above. The compound F-I can likewise be added in any order, but is preferably mixed in after bringing the metal complex into contact with B) and/or C).

It is also possible firstly to polymerize the catalyst system with α-olefins, preferably linear $C_2$-$C_{10}$-1-alkenes and in particular ethylene or propylene, and then to use the resulting prepolymerized catalyst solid in the actual polymerization. The mass ratio of catalyst solid used in the prepolymerization to monomer polymerized on is usually in the range from 1:0.1 to 1:1000, preferably from 1:1 to 1:200.

Furthermore, a small amount of an olefin, preferably an α-olefin, for example vinylcyclohexane, styrene or phenyldimethylvinylsilane, as modifying component, an antistatic or a suitable inert compound such as a wax or oil can be added as additive during or after the preparation of the catalyst system. The molar ratio of additives to metal complex is usually from 1:1000 to 1000:1, preferably from 1:5 to 20:1.

In the process for the polymerization of olefins, particular preference is given to using α-olefins, i.e. hydrocarbons having terminal double bonds, as monomers. Suitable monomers also include functionalized olefinically unsaturated compounds such as acrolein, ester or amide derivatives of acrylic or methacrylic acid, for example acrylates, methacrylates or acrylonitrile, or vinyl esters, for example vinyl acetate. Preference is given to using nonpolar olefin compounds, which include aryl-substituted α-olefins. Particularly preferred α-olefins are linear or branched $C_2$-$C_{12}$-1-alkenes, in particular linear $C_2$-$C_{10}$-1-alkenes such as ethylene, propylene, 1-butene, 1-pentene, 1-hexene, 1-heptene, 1-octene, 1-decene or branched $C_2$-$C_{10}$-1-alkenes such as 4-methyl-1-pentene, conjugated and nonconjugated dienes such as 1,3-butadiene, 1,5-hexadiene, 1,7-octadiene or vinylaromatic compounds such as styrene or substituted styrene. It is also possible to polymerize mixtures of various α-olefins. Preference is given to polymerizing at least one olefin selected from the group consisting of ethene, propene, 1-butene, 1-pentene, 1-hexene, 1-heptene, 1-octene and 1-decene.

Further suitable olefins include ones in which the double bond is part of a cyclic structure which may comprise one or more ring systems. Example are cyclopentene, cyclohexene, norbornene or tetracyclododecene, and methylnorbornene and dienes such as 5-ethylidene-2-norbornene, norbornadiene or ethylnorbornadiene.

Mixtures of two or more olefins can also be polymerized. As comonomers in ethylene polymerization, preference is given to using $C_3$-$C_8$-α-olefins, in particular 1-butene, 1-pentene, 1-hexene and/or 1-octene. Preference is given to using monomer mixtures containing at least 50 mol % of ethylene. Preferred comonomers in the polymerization of propylene are ethylene and/or butene.

The polymerization process can be carried out in a known manner in bulk, in suspension, in the gas phase or in a supercritical medium in the customary reactors employed for the polymerization of olefins. It can be carried out batchwise or preferably continuously in one or more stages. High-pressure polymerization processes in tube reactors or autoclaves, solution processes, suspension processes, stirred gas-phase processes or gas-phase fluidized-bed processes are possible.

The polymerizations are usually carried out at from −60 to 350° C. under pressures of from 0.5 to 4000 bar at mean residence times of from 0.5 to 5 hours, preferably from 0.5 to 3 hours. The advantageous pressure and temperature ranges for carrying out the polymerization depend greatly on the polymerization method. In high-pressure polymerization processes, which are usually carried out at pressures of from 1000 to 4000 bar, in particular from 2000 to 3500 bar, high polymerization temperatures are generally also set. Advantageous temperature ranges for these high-pressure polymerization processes are from 200 to 320° C., in particular from 220 to 290° C. In the case of low-pressure polymerization processes, it is usual to set a temperature which is at least a few degrees below the softening temperature of the polymer. In particular, temperatures of from 50 to 180° C., preferably from 70 to 120° C., are set in these polymerization processes. In the case of suspension polymerizations, polymerization is usually carried out in a suspension medium, preferably in an inert hydrocarbon such as isobutane, or else in the monomers themselves. The polymerization temperatures are generally in the range from −20 to 115° C., and the pressure is generally in the range from 1 to 100 bar. The solids content of the suspension is generally in the range from 10 to 80%. Polymerization can be carried out either batchwise, e.g. in stirring autoclaves, or continuously, e.g. in tube reactors, preferably in loop reactors. In particular, the polymerization can be carried out by the Phillips PF process, as described in U.S. Pat. No. 3,242,150 and U.S. Pat. No. 3,248,179. The gas-phase polymerization is generally carried out in the range from 30 to 125° C.

Among the polymerization processes mentioned, particular preference is given to gas-phase polymerization, in particular in gas-phase fluidized-bed reactors, solution polymerization and suspension polymerization, in particular in loop reactors and stirred tank reactors. The gas-phase polymerization can also be carried out in the condensed or supercondensed mode, in which part of the circulating gas is cooled to below the dew point and returned as a two-phase mixture to the reactor. The various polymerization processes, or else identical polymerization processes, can also, if desired, be connected in series and thus form a polymerization cascade. Furthermore, molar mass regulators, for example hydrogen, or additional additives such as antistatics can be employed in the polymerization.

The addition of the compound of the formula F-I results in modification of the group C=E or the heteroaromatic ring system containing at least one atom from the group consisting of N, P, O and S in the metal complex. This is also possible after the metal complex has been converted into a polymerization-active form, for example by reaction with C) and possibly D). An imino group can thus, for example, be converted into an amide. Pyridines and quinolines can, for example, be substituted in the 2 position in this way. The reactions on the free compounds are known and are described, for example, in Wakefield "Organomagnesium methods in Organic Synthesis", p. 96.

This produces a second metal complex which forms a polymer having a different molecular weight and/or displays different comonomer incorporation behavior.

This chemical modification enables the process to be used for controlling the molar mass distribution $M_w/M_n$ and/or the comonomer incorporation behavior.

The process of the present invention enables polymers of olefins to be prepared. The term polymerization as used here for describing the invention encompasses both polymerization and oligomerization, i.e. oligomers and polymers having molar masses $M_w$ in the range from about 56 to 3 000 000 can be produced by this process. Depending on the compound F-I, the molar mass distributions $M_w/M_n$ can be varied in a wide range from 2 to 30, preferably from 2 to 20 and particularly preferably from 2 to 10.

Owing to their good mechanical properties, the olefin polymers prepared using the catalyst system of the present invention are especially suitable for the production of films, fibers and moldings.

The catalyst systems of the present invention display a very high productivity in the polymerization of olefins, offer advantages in the work-up of the polymers after the polymerization and lead to significantly fewer problems in respect of catalyst residues in the polymer. The polymers prepared using the catalyst system of the present invention are advantageous for applications which require a high product purity. In addition, the catalyst systems of the present invention also display a very good activity at a relatively low molar ratio of the aluminoxane to organotransition metal compound.

EXAMPLES

To characterize the samples, the following tests were carried out:

Determination of the Eta Value:

using an automatic Ubbelohde viscometer (Lauda PVS 1) using decalin as solvent at 130° C. (ISO 1628 at 130° C., 0.001 g/ml of decalin)

The determination of the molar mass distributions and the means $M_n$, $M_w$, $M_w/M_n$ and $M_Z$ derived therefrom was carried out by means of high-temperature gel permeation chromatography using a method based on DIN 55672 under the following conditions: solvent: 1,2,4-trichloro-benzene, flow: 1 ml/min, temperature: 135° C., calibration using PE standards.

The comonomer content of the polymer (% $C_6$), its methyl side chain content per 1000 carbon atoms of the polymer chain ($CH_3/1000$) and its density (ISO 1183) were determined by IR spectroscopy.

The catalyst used in the following examples was in each case 1-(8-quinolyl)-2,3,4,5-tetramethylcyclopentadienylchromium dichloride. The preparation of this complex is described in WO 01/12641. The catalyst solutions were in each case prepared in a flask in which the subsequent polymerization was carried out. The polymerization was carried out at 50° C. in a 1 l four-necked flask fitted with contact thermometer, stirrer with Teflon blade, heating mantle and gas inlet tube. The polymerization was stopped by addition of a mixture of 15 ml of concentrated hydrochloric acid and 50 ml of methanol at 0° C. and the mixture was stirred for another 15 minutes. A further 250 ml of methanol were then added and stirring was continued for 15 minutes, after which the polymer was filtered off, washed three times with methanol and dried at 70° C.

Comparative Example C1

4.22 mg of 1-(8-quinolyl)-2,3,4,5-tetramethylcyclopentadienylchromium dichloride (11.3 µmol) were dissolved in 250 ml of toluene, heated to 40° C. and admixed with 18.4 mg of dimethylanilinium tetrakis(pentafluorophenyl)borate (22.7 µmol). After the reaction mixture had been heated to 70° C. and stirred at 70° C. for 10 minutes, it was cooled to 50° C. and then admixed with 0.284 ml of a 2 M solution of triisobutylaluminum (567 µmol) in heptane. 5 ml of hexene were then added and about 20-40 l/h of ethylene were subsequently passed through the solution for 15 minutes. The work-up was carried out as described above.

The productivity was 3245 g of PE/(mmol of chromium complex×h).

The product data are summarized in table 1.

Example 1

4.67 mg of 1-(8-quinolyl)-2,3,4,5-tetramethylcyclopentadienylchromium dichloride (12.6 µmol) were dissolved in 250 ml of toluene, heated to 40° C. and admixed with 20.3 mg of dimethylanilinium tetrakis(pentafluorophenyl)borate (25.1 µmol). After the reaction mixture had been heated to 70° C. and stirred at 70° C. for 10 minutes, it was cooled to 50° C. and then admixed firstly with 0.215 ml of a 0.875 M solution of butyloctylmagnesium (188.25 µmol) in heptane and subsequently with 0.31 ml of a 2 M solution of triisobutylaluminum (628 µmol) in heptane. 5 ml of hexene were then added and about 20-40 l/h of ethylene were subsequently passed through the solution for 15 minutes.

The work-up was carried out as described above.

The productivity was 1785 g of PE/(mmol of chromium complex×h).

The product data are summarized in table 1.

Example 2

4.3 mg of 1-(8-quinolyl)-2,3,4,5-tetramethylcyclopentadienylchromium dichloride (11.6 µmol) were dissolved in 250 ml of toluene, heated to 40° C. and admixed with 18.7 mg of dimethylanilinium tetrakis(pentafluorophenyl)borate (23.16 µmol). After the reaction mixture had been heated to 70° C. and stirred at 70° C. for 10 minutes, it was cooled to 50° C. and then admixed firstly with 0.217 ml of a 0.16 M solution of n-butyllithium in hexane (34.7 µmol) and subsequently with 0.29 ml of a 2 M solution of triisobutylaluminum (579 µmol) in heptane. 5 ml of hexene were then added and about 20-40 l/h of ethylene were subsequently passed through the solution for 60 minutes.

The work-up was carried out as described above.

The productivity was 147 g of PE/(mmol of chromium complex×h).

The product data are summarized in table 1.

TABLE 1

| | Polymer data | | | | |
|---|---|---|---|---|---|
| Ex. | Eta [dl/g] | Density [g/cm$^3$] | % $C_6$ | $M_w$ | $M_w/M_n$ |
| C1 | 2.02 | 0.9099 | 6.1 | 151 502 | 3.01 |
| 1 | 1.47 | 0.9367 | 3.3 | 109 936 | 8.49 |
| 2 | 5.74 | 0.9259 | 1.7 | 628 848 | 7.67 |

Example 3

Example 2 was repeated, but the n-butyllithium (0.6 equivalents per mole of Cr) was added after the addition of the triisobutylaluminum. It can be seen from the CRYSTAF spectra that the composition distribution is broader in example 3 than in C1, i.e. example 3 results in formation of not only the copolymers of C1 but also further copolymers which have a different comonomer content.

We claim:

1. A process for the polymerization of olefins, which comprises polymerizing the olefins in the presence of a catalyst system comprising the reaction product of:
A) a metal complex of formula (Cp)(—Zm-A)MXk, where the variables have the following meanings:
Cp is a cyclopentadienyl system,
Z is a divalent bridge between A and Cp,
A is an unsubstituted, substituted or fused, heteroaromatic ring system containing at least one atom selected from the group consisting of N, P, O and S,
M is a metal of group 3, 4, 5 or 6 of the Periodic Table,
X are each, independently of one another, fluorine, chlorine, bromine, iodine, hydrogen, $C_1$-$C_{10}$-alkyl, $C_2$-$C_{10}$-alkenyl, $C_6$-$C_{20}$-aryl, alkylaryl having 1-10 carbon atoms in the alkyl part and 6-20 carbon atoms in the aryl part, $NR^6R^7$, $OR^6$, $SR^6$, $SO_3R^6$, $OC(O)R^6$, $BF_4^-$, $PF_6^-$ or a bulky noncoordinating anion,
$R^6$-$R^7$ are each, independently of one another, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part, $SiR^8_3$, where the organic radicals $R^6$-$R^7$ may also be substituted by halogens or two radicals $R^6$-$R^7$ may also be joined to form a five- or six-membered ring,
$R^8$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part or two radicals $R^8$ may also be joined to form a five- or six-membered ring,
k is 1, 2 or 3 and
m is 0,
B) optionally an organic or inorganic support,
C) one or more cation-forming compounds selected from strong, uncharged Lewis acids of the compounds of formula (F XII):

$$M^{2D}X^{1D}X^{2D}X^{3D} \quad \text{(F XII)}$$

where
$M^{2D}$ is an element of group 13 of the Periodic Table of the Elements,
$X^{1D}$, $X^{2D}$, $X^{3D}$ are each hydrogen, $C_1$-$C_{10}$-alkyl, $C_6$-$C_{15}$-aryl, alkylaryl, arylalkyl, haloalkyl or haloaryl each having from 1 to 10 carbon atoms in the alkyl radical and from 6 to 20 carbon atoms in the aryl radical, or fluorine, chlorine, bromine or iodine,
salt-like compounds of the cation of the formula (F XIII):

$$[((M^{3D})^{a+}Q_1Q_2 \ldots Q_z]^{d+} \quad \text{(F XIII)}$$

where
$M^{3D}$ is an element groups 1 to 16 of the Periodic Table of the Elements,
$Q_1$ to $Qz$ are singly negatively charged groups of $C_1$-$C_{28}$ alkyl, $C_6$-$C_{15}$-aryl, alkylaryl, arylalkyl, haloalkyl, haloaryl each having from 6 to 20 atoms in the aryl radical and from 1 to 28 carbon atoms in the alkyl radical, $C_3$-$C_{10}$-cycloalkyl which may bear $C_1$-$C_{10}$-alkyl groups as substituents, halogen, $C_1$-$C_{28}$-alkoxy, $C_6$-$C_{15}$-aryloxy, silyl or mercaptyl groups,
a is an integer from 1 to 6,
z is an integer from 0 to 5,
d is the difference a-z, but d is greater than or equal to 1,
protonated amine or aniline derivatives as Brønsted acid cations with noncoordinating counterions, or alumoxane; and
D) optionally one or more metal compounds of group 13 of the Periodic Table, with a compound of the formula F-I $$M^1(R^3)_{r^A}(R^4)_{s^A} \quad \text{(F-I)}$$

where
$M^1$ is Li, Na, or Be,
$R^3$ is $C_1$-$C_{20}$-alkyl, $C_2$-$C_{20}$-alkenyl, $C_6$-$C_{20}$-aryl, or alkylaryl having from 1 to 10 carbon atoms in the alkyl part and 6-20 carbon atoms in the aryl part,
$R^4$ is hydrogen, halogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part or alkoxy having from 1 to 10 carbon atoms in the alkyl radical,
$r^A$ is 1 or 2
and
$s^A$ is 0 or 1, where the sum $r^A+s^A$ corresponds to the valence of $M^1$, resulting in modification of the heteroaromatic ring system,
wherein the reaction is carried out prior to the polymerization, and
the olefins are selected from the group consisting of linear or branched $C_2$-$C_{12}$-1-alkenes and aryl substituted α-olefins.

2. A process for the polymerization of olefins, which comprises polymerizing the olefins in the presence of a catalyst system comprising the reaction product of:
A) a metal complex of formula (Cp)(—Zm-A)MXk, where the variables have the following meanings:
Cp is a cyclopentadienyl system,
Z is a divalent bridge between A and Cp,
A is an unsubstituted, substituted or fused, heteroaromatic ring system containing at least one atom selected from the group consisting of N, P, O and S,
M is a metal of group 3, 4, 5 or 6 of the Periodic Table,
X are each, independently of one another, fluorine, chlorine, bromine, iodine, hydrogen, $C_1$-$C_{10}$-alkyl, $C_1$-$C_{10}$-alkenyl, $C_6$-$C_{20}$-aryl, alkylaryl having 1-10 carbon atoms in the alkyl part and 6-20 carbon atoms in the aryl part, $NR^6R^7$, $OR^6$, $SR^6$, $SO_3R^6$, $OC(O)R^6$, $BF_4^-$, $PF_b^-$ or a bulky noncoordinating anion,
$R^6$-$R^7$ are each, independently of one another, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part, $SiR^8_3$, where the organic radicals $R^6$-$R^7$ may also be substituted by halogens or two radicals $R^6$-$R^7$ may also be joined to form a five- or six-membered ring,
$R^8$ are each, independently of one another, hydrogen, $C_1$-$C_{20}$-alkyl, $C_2$-$C_{20}$-alkenyl, alkylaryl having from 1 to 10 carbon atoms in the alkyl part and 6-20 carbon atoms in the aryl part or two radicals $R^8$ may also be joined to form a five- or six-membered ring,
k is 1, 2 or 3 and
m is 0,
B) optionally an organic or inorganic support,
C) one or more cation-forming compounds, and
D) one or more metal compounds of group 13 of the Periodic Table, with a compound of the formula F-I $$M^1(R^3)_{r^A}(R^4)_{s^A} \quad \text{(F-I)}$$

where
$M^1$ is Li, Na, K, or Be,
$R^3$ is $C_1$-$C_{20}$-alkyl, $C_2$-$C_{20}$-alkenyl, $C_6$-$C_{20}$-aryl, or alkylaryl having from 1 to 10 carbon atoms in the alkyl part and 6-20 carbon atoms in the aryl part,
$R^4$ is hydrogen, halogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part or alkoxy having from 1 to 10 carbon atoms in the alkyl radical, $r^A$ is 1 or 2
and
$s^A$ is 0 or 1, where the sum $r^A+s^A$ corresponds to the valence of $M^1$, resulting in modification of the heteroaromatic ring system,
   wherein the reaction is carried out prior to the polymerization, and
   the olefins are selected from the group consisting of linear or branched $C_2$-$C_{12}$-1-alkenes and aryl substituted α-olefins.

3. A process for the polymerization of olefins, which comprises polymerizing the olefins in the presence of a catalyst system consisting of the reaction product of
   A) a metal complex of formula (Cp)(—Zm-A)MXk, where the variables have the following meanings:
   Cp is a cyclopentadienyl system,
   Z is a divalent bridge between A and Cp,
   A is an unsubstituted, substituted or fused, heteroaromatic ring system containing at least one atom selected from the group consisting of N, P, O and S,
   M is a metal of group 3, 4, 5 or 6 of the Periodic Table,
   X are each, independently of one another, fluorine, chlorine, bromine, iodine, hydrogen, $C_1$-$C_{10}$-alkyl, $C_2$-$C_{10}$-alkenyl, $C_6$-$C_{20}$-aryl, alkylaryl having 1-10 carbon atoms in the alkyl part and 6-20 carbon atoms in the aryl part, $NR^6R^7$, $OR^6$, $SR^6$, $SO_3R^6$, $OC(O)R^6$, $BF_4^-$, $PF_6^-$ or a bulky noncoordinating anion,
   $R^6$-$R^7$ are each, independently of one another, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part, $SiR^8_3$, where the organic radicals $R^6$-$R^7$ may also be substituted by halogens or two radicals $R^6$-$R^7$ may also be joined to form a five- or six-membered ring,
   $R^8$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part or two radicals $R^8$ may also be joined to form a five- or six-membered ring,
   k is 1, 2 or 3 and
   m is 0,
   B) optionally, an organic or inorganic support,
   C) one or more cation-forming compounds, and
   D) one or more metal compounds of group 13 of the Periodic Table, with a compound of the formula F-I, $$M^1(R^3)_{r^A}A(R^4)_{s^A} \quad (F\text{-}I)$$

where
$M^1$ is Li, Na, K, or Be,
$R^3$ is $C_1$-$C_{20}$-alkyl, $C_2$-$C_{20}$-alkenyl, $C_6$-$C_{20}$-aryl, or alkylaryl having from 1 to 10 carbon atoms in the alkyl part and 6-20 carbon atoms in the aryl part,
$R^4$ is hydrogen, halogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part or alkoxy having from 1 to 10 carbon atoms in the alkyl radical,
$r^A$ is 1 or 2
and
$s^A$ is 0 or 1, where the sum $r^A+s^A$ corresponds to the valence of $M^1$, resulting in modification of the heteroaromatic ring system,
   wherein the reaction is carried out prior to the polymerization, and
   the olefins are selected from the group consisting of linear or branched $C_2$-$C_{12}$-1-alkenes and aryl substituted α-olefins.

4. The process as claimed in claim 3, wherein, in the metal complex A), at least one atom selected from the group consisting of N, P, O and S in the heteroaromatic ring system is bound directly to the metal in the metal complex.

5. The process of claim 3, wherein $M^1$ in the compound of the formula F-I is lithium.

6. The process as claimed in claim 3, wherein in the metal complex A) of the formula (Cp)(—$Z_m$-A)MX$_k$, A is selected from the group consisting of

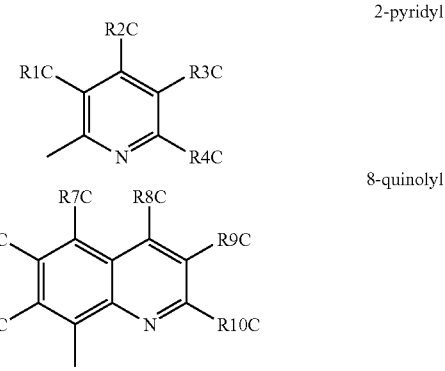

where
$R^{1C}$-$R^{16C}$ are each independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part or $SiR^{11C}_3$, where the organic radicals $R^{1C}$-$R^{10C}$ may also be substituted by halogens and two vicinal radicals $R^{1C}$-$R^{10C}$ may also be joined to form a five- or six-membered ring and
$R^{11C}$ are each, independently of one another, hydrogen, $C_1$-$C_{20}$-alkyl, $C_2$-$C_{20}$-alkenyl, $C_6$-$C_{20}$-aryl or alkylaryl having from 1 to 10 carbon atoms in the alkyl part or 6-20 carbon atoms in the aryl part and two radicals $R^{11C}$ may also be joined to form a five- or six-membered ring.

7. A process for the polymerization of olefins, which comprises polymerizing the olefins in the presence of a catalyst system consisting of the reaction product of
   A) a metal complex of formula (Cp)(—Zm-A)MXk, where the variables have the following meanings:
   Cp is a cyclopentadienyl system,
   Z is a divalent bridge between A and Cp,
   A is an unsubstituted, substituted or fused, heteroaromatic ring system containing at least one atom selected from the group consisting or N, P, O and S,
   M is a metal of group 3, 4, 5 or 6 of the Periodic Table,
   X are each, independently of one another, fluorine, chlorine, bromine, iodine, hydrogen, $C_1$-$C_{10}$-alkyl, $C_2$-$C_{10}$-alkenyl, $C_6$-$C_{20}$-aryl, alkylaryl having 1-10 carbon atoms in the alkyl part and 6-20 carbon atoms in the aryl part, $NR^6R^7$, $OR^6$, $SR^6$, $SO_3R^6$, $OC(O)R^6$, $BF_4^-$, $PF_6^-$ or a bulky noncoordinating anion,
   $R^6$-$R^7$ are each, independently of one another, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part, $SiR^8_3$, where the organic radicals $R^6$-$R^7$ may also be substituted by halogens or two radicals $R^6$-$R^7$ may also be joined to form a five- or six-membered ring,
   $R^8$ are each; independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part or two radicals $R^8$ may also be joined to form a five- or six-membered ring, k is 1, 2 or 3 and m is 0, B) an organic support or inorganic support selected from silica gel, magnesium chloride or aluminum oxide, C) one or more cation-forming compounds and D) optionally one or more metal compounds of group 13 of the Periodic Table, with a compound of the formula F-1

$$M^1(R^3)_{r^A}(R^4)_{s^A} \qquad (F\text{-}I)$$

where $M^1$ is Li, Na, K, or Be, $R^3$ is $C_1$-$C_{20}$-alkyl, $C_2$-$C_{20}$-alkenyl, $C_6$-$C_{20}$-aryl, or alkylaryl having from 1 to 10 carbon atoms in the alkyl part and 6-20 carbon atoms in the aryl part, $R^4$ is hydrogen, halogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part or alkoxy having from 1 to 10 carbon atoms in the alkyl radical, $r^A$ is 1 or 2 and $s^A$ is 0 or 1, where the sum $r^A+s^A$ corresponds to the valence of $M^1$, resulting in modification of the heteroaromatic ring system, wherein the reaction is carried out prior to the polymerization, and the olefins are selected from the group consisting of linear or branched $C_2$-$C_{12}$-1-alkenes and aryl substituted α-olefins.

* * * * *